(12) United States Patent
Schilling et al.

(10) Patent No.: US 12,441,772 B2
(45) Date of Patent: Oct. 14, 2025

(54) DESIGNED ANKYRIN REPEAT DOMAIN WITH IMPROVED STABILITY

(71) Applicant: MOLECULAR PARTNERS AG, Schlieren (CH)

(72) Inventors: Johannes Schilling, Schlieren (CH); Marcel Walser, Schlieren (CH)

(73) Assignee: Molecular Partners AG, Schlieren (CH)

( * ) Notice: Subject to any disclaimer, the term of this patent is extended or adjusted under 35 U.S.C. 154(b) by 340 days.

(21) Appl. No.: 17/596,102

(22) PCT Filed: Jun. 3, 2020

(86) PCT No.: PCT/EP2020/065314
§ 371 (c)(1),
(2) Date: Dec. 2, 2021

(87) PCT Pub. No.: WO2020/245171
PCT Pub. Date: Dec. 10, 2020

(65) Prior Publication Data
US 2024/0124535 A1 Apr. 18, 2024

(30) Foreign Application Priority Data
Jun. 4, 2019 (EP) .................. 19178282

(51) Int. Cl.
*C07K 14/00* (2006.01)
*C07K 14/47* (2006.01)
*A61K 38/00* (2006.01)
*C07K 14/435* (2006.01)
*C07K 14/765* (2006.01)

(52) U.S. Cl.
CPC .............. *C07K 14/47* (2013.01); *A61K 38/00* (2013.01); *C07K 14/435* (2013.01); *C07K 14/765* (2013.01); *C07K 2319/35* (2013.01); *C07K 2319/70* (2013.01)

(58) Field of Classification Search
CPC .... C07K 14/47; C07K 14/435; C07K 14/765; C07K 2319/35; C07K 2319/70; A61K 38/00
See application file for complete search history.

(56) References Cited

U.S. PATENT DOCUMENTS

| | | |
|---|---|---|
| 8,937,153 B2 | 1/2015 | Abrahmsen et al. |
| 9,284,361 B2 | 3/2016 | Steiner et al. |
| 2010/0034194 A1 | 2/2010 | Fieremans et al. |
| 2010/0129368 A9 | 5/2010 | Lasters et al. |

FOREIGN PATENT DOCUMENTS

| | | |
|---|---|---|
| WO | 9101743 | 2/1991 |
| WO | 0220565 A2 | 3/2002 |
| WO | 2004041865 A2 | 5/2004 |
| WO | 2006122787 A1 | 11/2006 |
| WO | 2007103515 A2 | 9/2007 |
| WO | 2008096158 A2 | 8/2008 |
| WO | 2008155134 A1 | 12/2008 |
| WO | 2011095545 A1 | 8/2011 |
| WO | 2012004384 A2 | 1/2012 |
| WO | WO 2012/069654 A1 | 5/2012 |
| WO | WO 2014/083208 A1 | 6/2014 |
| WO | WO 2016/156596 A1 | 10/2016 |
| WO | WO 2018/054971 A1 | 3/2018 |
| WO | 2013043071 A1 | 3/2023 |

OTHER PUBLICATIONS

Binz, H. Kaspar et al., "Engineering novel binding proteins from nonimmunoglobulin domains," Nature Biotechnology, vol. 23, No. 10, pp. 1257-1268 (2005).
International Search Report for International Patent Application No. PCT/EP2020/065314, dated Sep. 10, 2020. (4 pages).
Written Opinion of the International Search Authority for International Patent Application No. PCT/EP2020/065314. (4 pages).
Binz, H. Kaspar, "Engineering novel binding proteins from nonimmunoglobulin domains", Nature Biotechnology, Gale Group Inc, New York, vol. 23, No. 10, pp. 1257-1268 (2005).
International Search Report and Written Opinion of the International Search Authority for International Patent Application No. PCT/EP2020/065314, Sep. 10, 2020 (6 pages).
Forrer, Patrik et al., "A novel strategy to design binding molecules harnessing the modular nature of repeat proteins," FEBS Letters 539, pp. 2-6 (2003).
Freid, F.Y., "Half-Life Extension by Binding to Albumin through an Albumin Binding Domain", in Therapeutic Proteins: Strategies to Modulate Their Plasma Half-lives,: Kontermann R , pp. 269-283 (2012).
Hopp et al., "The effects of affinity and valency of an albumin-binding domain (ABD) on half-life of a singe-chain diabody-ABD fusion protein", Prot Eng, vol. 23, No. 11, pp. 827-834 (2010).
Jonsson et al., "Engineering of a femtomolar affinity binding protein to human serum albumin," Prot Eng Des Sel, vol. 21, No. 8, pp. 512-527 (2008).
Main E.R. et al., "Design of Stable α-Helical Arrays from an Idealized TPR Motif," Structure, vol. 11, pp. 497-508 (2003).

(Continued)

*Primary Examiner* — Jeanette M Lieb

(57) ABSTRACT

The present disclosure relates to designed ankyrin repeat domains with binding specificity for serum albumin and, in particular, to such designed ankyrin repeat domains with improved stability. The disclosure further relates to recombinant binding proteins comprising such designed ankyrin repeat domain(s), nucleic acids encoding such designed ankyrin repeat domains or proteins, pharmaceutical compositions comprising such proteins and the use of such proteins or pharmaceutical compositions in the treatment of diseases.

17 Claims, 7 Drawing Sheets
Specification includes a Sequence Listing.

(56) References Cited

OTHER PUBLICATIONS

Nguyen et al., "The parmacokinetics of an albumin-binding Fab (AB.Fab) can be modulated as a function of affinity for albumin", Prot Eng, vol. 19, No. 7, pp. 291-297 (2006).
Nygren et al., "In vivo Stabilzation of a Human Recombinant CD4 Derivateive by Fusion to a Serum-albumin-binding Receptor", Vaccines, vol. 91, pp. 363-368 (1991).

Fig. 1

```
                                 1            2            3
                     1           0            0            0
SEQ ID NO: 2:        DLGKKLLEAARAGQDDEVRELLKAGADVNA
SEQ ID NO: 3:        DLGKKLLEAARAGQDDEVRELLKAGADVNA
SEQ ID NO: 4:        DLGKKLLEAARAGQDDEVRELLKAGADVNA 4            5            6
                                 0            0            0
SEQ ID NO: 2:        KDYFSHTPLHLAARNGHLKIVEVLLKAGADVNA
SEQ ID NO: 3:        KDYFSHTPLHLAARNGHLKIVEVLLKAGADVNA
SEQ ID NO: 4:        KDYFSHTPLHLAARNGHLKIVEVLLKAGADVNA 7            8            9
                                 0            0            0
SEQ ID NO: 2:        KDFAGKTPLHLAANEGHLEIVEVLLKAGADVNA
SEQ ID NO: 3:        KDFAGKTPLHLAAADGHLEIVEVLLKAGADVNA
SEQ ID NO: 4:        KDFAGKTPLHLAADAGHLEIVEVLLKAGADVNA 1            1         1  1
                                 0            1         2  2
                                 0            0         0  4
SEQ ID NO: 2:        QDIFGKTPADIAADAGHEDIAEVLQKAA
SEQ ID NO: 3:        QDIFGKTPADIAADAGHEDIAEVLQKAA
SEQ ID NO: 4:        QDIFGKTPADIAADAGHEDIAEVLQKAA
```

Fig. 2

```
                     7 7 7
                     7 8 9
SEQ ID NO: 2:        N E G
SEQ ID NO: 3:        A D G
SEQ ID NO: 4:        D A G
SEQ ID NO: 5:        I D G
SEQ ID NO: 6:        D D G
```

Fig. 5a
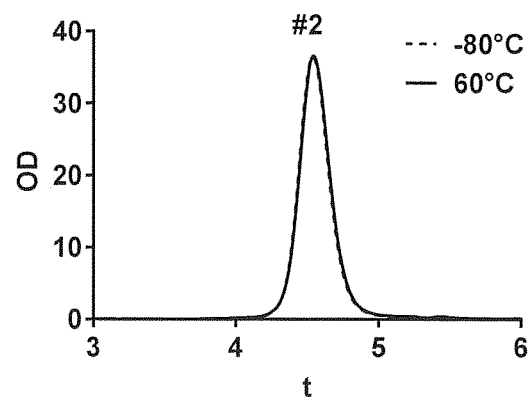
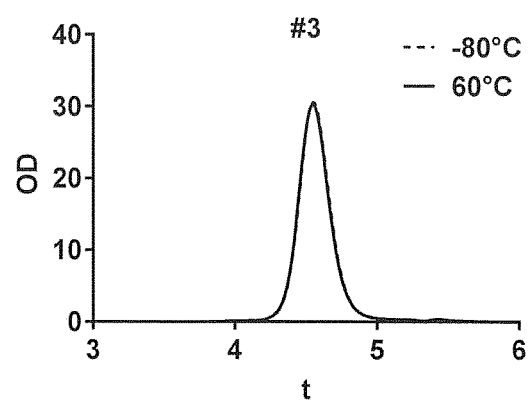
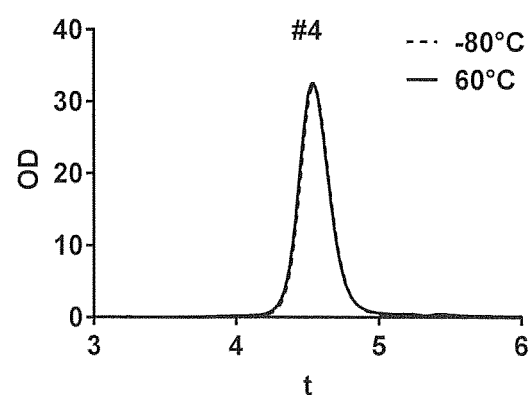

Fig. 5b
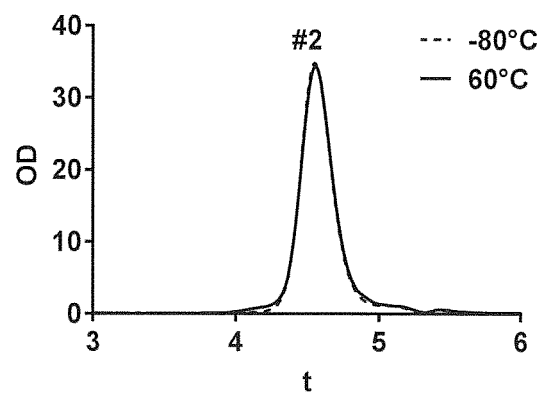
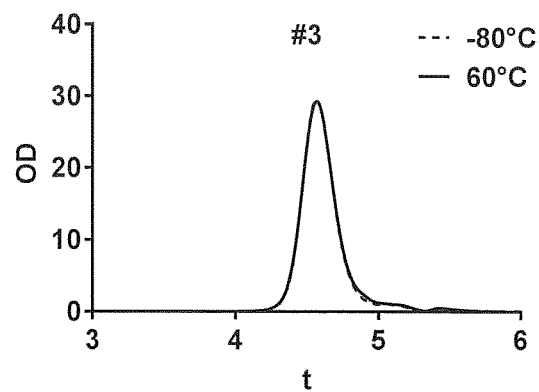
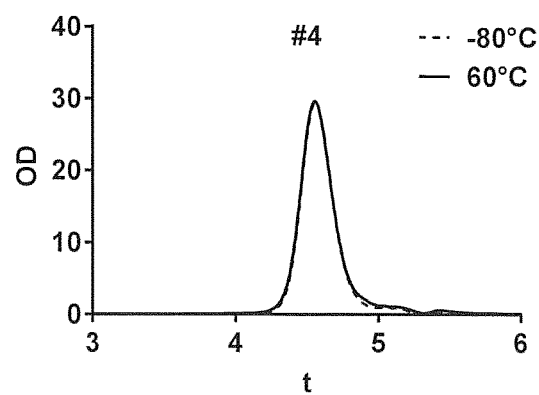

Fig. 5c
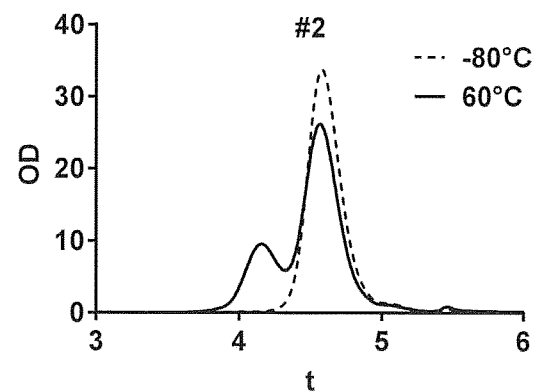
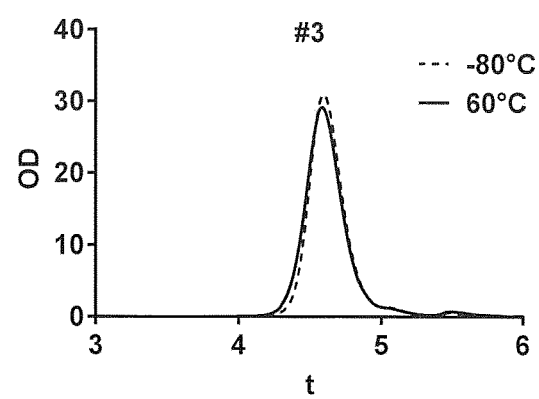
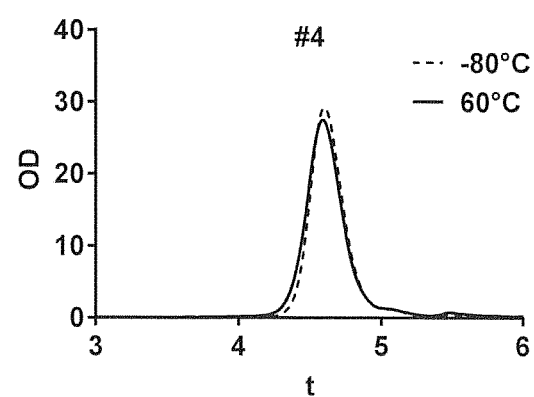

DESIGNED ANKYRIN REPEAT DOMAIN WITH IMPROVED STABILITY

CROSS-REFERENCE TO RELATED APPLICATION

This application is a national stage filing under 35 U.S.C. § 371 of International Application No. PCT/EP2020/065314, filed on Jun. 3, 2020, which claims the benefit of and priority from European patent application EP19178282, filed on Jun. 4, 2019. The contents of these applications are incorporated herein by reference.

INCORPORATION BY REFERENCE

The Sequence Listing provided in the file named "SequenceListing.txt" with a size of 38,130 bytes, which was created on Oct. 3, 2022, and which is filed herewith, is incorporated by reference in its entirety.

FIELD OF THE INVENTION

The present invention relates to designed ankyrin repeat domains with binding specificity for serum albumin and, in particular, to such designed ankyrin repeat domains with improved stability. The invention further relates to recombinant binding proteins comprising such designed ankyrin repeat domain(s), nucleic acids encoding such designed ankyrin repeat domains or proteins, pharmaceutical compositions comprising such proteins and the use of such proteins or pharmaceutical compositions in the treatment of diseases.

BACKGROUND OF THE INVENTION

For biological drug products, in which the active components are typically proteins and/or polypeptides, maintenance of molecular conformation and, hence of biological activity, is dependent on noncovalent as well as covalent forces. These products are particularly sensitive to environmental factors such as temperature changes, oxidation, light, ionic content, and shear. In order to ensure maintenance of biological activity, it is critical that the active components of such drug products withstand the conditions they are exposed to during manufacturing, transport and storage. Degradation and other forms of molecular changes need to be avoided as much as possible. Thus, the development of stable active components is critical to the successful development of a commercial product.

Designed ankyrin repeat domains with binding specificity for serum albumin have been described and they are particularly useful for the creation of recombinant binding proteins with prolonged terminal half-life (see, e.g., WO2012/069654). Such increased half-life in plasma, compared to proteins not comprising said designed ankyrin repeat domains with binding specificity for serum albumin, is highly beneficial for therapeutic uses. For example, WO2016/156596 describes a therapeutically useful ankyrin repeat protein comprising designed ankyrin repeat domains with binding specificity for serum albumin.

Despite the development of such designed ankyrin repeat domains with binding specificity for serum albumin, there is still the need and challenge to improve the stability properties, and in particular the storage stability properties, of today's medicinal products in general and of ankyrin repeat domains with binding specificity for serum albumin in particular.

SUMMARY OF THE INVENTION

We have surprisingly found that the designed ankyrin repeat domains with binding specificity for serum albumin of the present invention provide for further improved stability properties, and in particular for improved storage stability properties. Thus, we have found that the inventive designed ankyrin repeat domains lead not only to improved storage stability in liquid formulations, but also to beneficial stability properties during heat treatment at elevated temperatures, for example at 60° C., in such liquid formulations. The latter is in particular beneficial for allowing purification of recombinant binding proteins comprising such designed ankyrin repeat domains. Moreover, the inventive designed ankyrin repeat domains showed an improved stability during pH shifts at elevated temperature, which are again highly beneficial when purifying recombinant binding proteins comprising such designed ankyrin repeat domains. The improvements of stability of the inventive designed ankyrin repeat domains are in particular evident by the lesser extent of identified lower molecular weight species assumed to be degradation products, for example, after incubation at elevated temperature and SDS PAGE analysis. In turn, an increased amount of higher molecular weight species, and thus a lesser amount of assumed degradation products, as compared to prior art products, were identified by size exclusion chromatography after recombinant binding proteins comprising the inventive designed ankyrin repeat domains were stored at lower pH. The storage of recombinant binding proteins at lower pH can often lead to the occurrence of unwanted lower molecular weight species. In addition, it is of note that the improvements in stability of the inventive designed ankyrin repeat domains do not diminish their binding specificity for serum albumin.

Thus, in one aspect, the invention provides a designed ankyrin repeat domain with binding specificity for serum albumin, wherein said designed ankyrin repeat domain comprises an amino acid sequence that has at least 80% sequence identity with the amino acid sequence of SEQ ID NO: 3 or 4, and wherein said designed ankyrin repeat domain does not have an asparagine (N) at the position corresponding to position 77 of SEQ ID NO: 3 or 4. In another aspect, the invention relates to a designed ankyrin repeat domain with binding specificity for serum albumin, wherein said designed ankyrin repeat domain comprises the amino acid sequence of SEQ ID NO: 13.

In a further aspect, the invention provides a recombinant binding protein comprising at least one, typically and preferably one or two, designed ankyrin repeat domain of the invention.

In another aspect, the invention provides a nucleic acid encoding the designed ankyrin repeat domain or the recombinant binding protein of the invention.

In a further aspect, the invention provides a pharmaceutical composition comprising the inventive designed ankyrin repeat domain, the inventive recombinant binding protein, or the inventive nucleic acid, and optionally a pharmaceutically acceptable carrier and/or diluent.

Further aspects and embodiments of the present invention will become apparent in the detailed description.

BRIEF DESCRIPTION OF THE FIGURES

FIG. 1. Sequence alignment of designed ankyrin repeat domains with binding specificity for serum albumin. SEQ ID NOs: 3 and 4 represent designed ankyrin repeat domains with binding specificity for serum albumin and with improved stability compared to the designed ankyrin repeat domain consisting of SEQ ID NO: 2. Residue numbers are indicated above the sequences FIG. 2. Sequence motifs at residue numbers 77 to 79 of different designed ankyrin repeat domains with binding specificity for serum albumin, aligned to the sequence motif of SEQ ID NO: 2. The SEQ ID NOs of the respective proteins are indicated at the left side of the alignment.

FIG. 5. Size-exclusion chromatography of designed ankyrin repeat domains with binding specificity for serum albumin. Proteins #2, #3, and #4 (consisting of SEQ ID NOs: 2, 3, and 4, respectively; additionally having SEQ ID NO: 1 at the N terminus) were produced as described in Example 2, followed by incubation at 60° C. (−80° C. for references) for 1 week at pH 7.4, pH 6, and pH 5, as described in Example 3, followed by storage stability assessment using size-exclusion chromatography analysis as described in Example 6. The overlays of the chromatograms obtained for each protein at 60° C. and −80° C. are shown for pH 7.4 in FIG. 5a, for pH 6 in FIG. 5b, and for pH 5 in FIG. 5c. The void volume elutes at 2.18 min, the total volume at 5.28 min. OD: Optical density at 280 nm (referenced by the optical density at 360 nm) in mAu [ ]; t: time in [min].

DETAILED DESCRIPTION OF THE INVENTION

Figure 3:
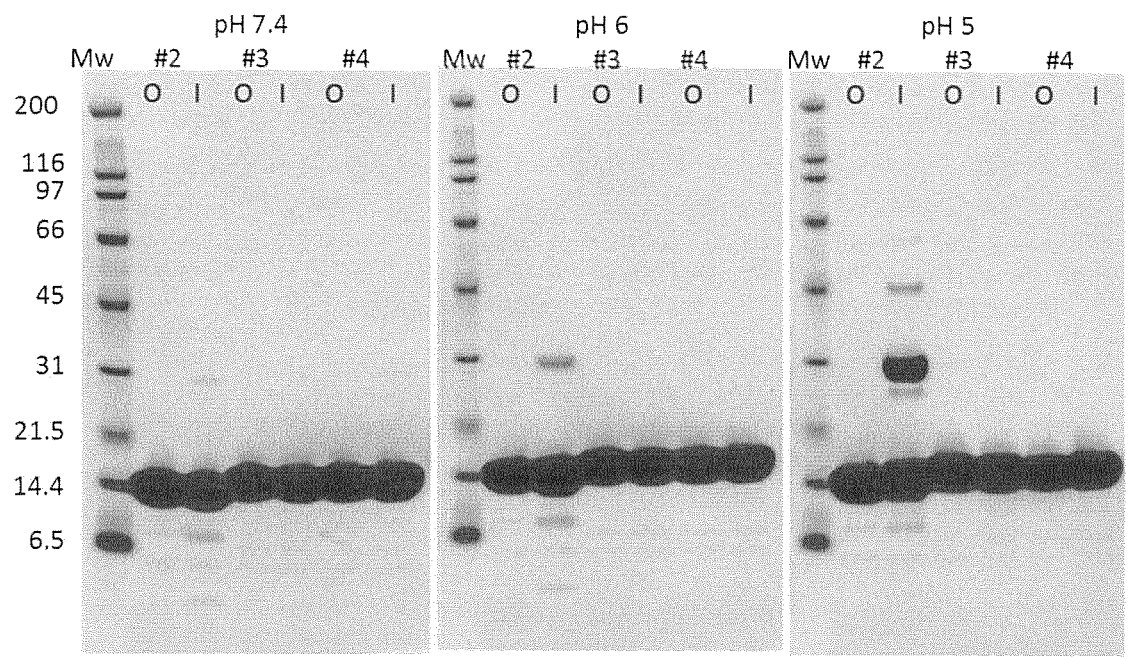
FIG. 3. SDS-PAGE comparing the stability of designed ankyrin repeat domains with binding specificity for serum albumin. Proteins #2, #3, and #4 (consisting of SEQ ID NOs: 2, 3, and 4, respectively; additionally having SEQ ID NO: 1 at the N terminus) were produced as described in Example 2, followed by incubation at 60° C. (−80° C. for references) for 1 week at pH 7.4, pH 6, and pH 5, as described in Example 3, followed by torage stability assessment using SDS-PAGE as described in Example 4. The three SDS PAGE pictures represent the measurements at pH 7.4, pH 6, and pH 5, as indicated above the respective gels. Proteins are indicated by their SEQ ID NO. 0: −80° C. incubated reference sample. I: 60° C. incubated sample. Mw: Molecular weight marker, with kDa values indicated on the left side.

The present invention provides designed ankyrin repeat domains with binding specificity for serum albumin, recombinant binding proteins comprising such designed ankyrin repeat domain(s), and further nucleic acids encoding such designed ankyrin repeat domains and recombinant binding proteins, as well as pharmaceutical compositions comprising said designed ankyrin repeat domains, binding proteins or nucleic acids. The present invention also provides the use of such recombinant binding proteins or pharmaceutical compositions in the treatment of diseases.

Thus, in one aspect, the invention provides a designed ankyrin repeat domain with binding specificity for serum albumin, wherein said designed ankyrin repeat domain comprises an amino acid sequence that has at least 80% sequence identity with the amino acid sequence of SEQ ID NO: 3 or 4, and wherein said designed ankyrin repeat domain does not have an asparagine (N) at the position corresponding to position 77 of SEQ ID NO: 3 or 4 and/or said designed ankyrin repeat domain does not have a glutamic acid (E) at the position corresponding to position 78 of SEQ ID NO: 3 or 4.

In one embodiment, said designed ankyrin repeat domain comprises an amino acid sequence that has at least 80% sequence identity with the amino acid sequence of SEQ ID NO: 3 or 4, and wherein said designed ankyrin repeat domain does not have an asparagine (N) at the position corresponding to position 77 of SEQ ID NO: 3 or 4.

In one embodiment, said designed ankyrin repeat domain comprises an amino acid sequence that has at least 80%, 81%, 82%, 83%, 84%, 85%, 86%, 87%, 88%, 89%, 90%, 91%, 92%, 93%, 94%, 95%, 96%, 97%, 98%, 99%, or 100% amino acid sequence identity with the amino acid sequence of SEQ ID NO: 3 or 4, and wherein said designed ankyrin repeat domain does not have an asparagine (N) at the position corresponding to position 77 of SEQ ID NO: 3 or 4. Thus, in one embodiment, said designed ankyrin repeat domain comprises an amino acid sequence that has at least 90% sequence identity with the amino acid sequence of SEQ ID NO: 3 or 4. In another embodiment, said designed ankyrin repeat domain comprises an amino acid sequence that has at least 93% sequence identity with the amino acid sequence of SEQ ID NO: 3 or 4. In another embodiment, said designed ankyrin repeat domain comprises an amino acid sequence that has at least 95% sequence identity with the amino acid sequence of SEQ ID NO: 3 or 4. In another embodiment, said designed ankyrin repeat domain comprises an amino acid sequence that has at least 98% sequence identity with the amino acid sequence of SEQ ID NO: 3 or 4. In another embodiment, said designed ankyrin repeat domain comprises the amino acid sequence of SEQ ID NO: 3 or 4.

In one embodiment, said designed ankyrin repeat domain does not have a glutamic acid (E) at the position corresponding to position 78 of SEQ ID NO: 3 or 4. Thus, in one embodiment, said designed ankyrin repeat domain comprises an amino acid sequence that has at least 80%, 81%, 82%, 83%, 84%, 85%, 86%, 87%, 88%, 89%, 90%, 91%, 92%, 93%, 94%, 95%, 96%, 97%, 98%, 99%, or 100% amino acid sequence identity with the amino acid sequence of SEQ ID NO: 3 or 4, preferably at least 90%, further preferably at least 93%, again further preferably at least 95%, and still further preferably at least 98%, and wherein said designed ankyrin repeat domain does not have a glutamic acid (E) at the position corresponding to position 78 of SEQ ID NO: 3 or 4.

In one embodiment, said designed ankyrin repeat domain does not have a serine (S) at the position corresponding to position 77 of SEQ ID NO: 3 or 4. Thus, in one embodiment, said designed ankyrin repeat domain comprises an amino acid sequence that has at least 80%, 81%, 82%, 83%, 84%, 85%, 86%, 87%, 88%, 89%, 90%, 91%, 92%, 93%, 94%, 95%, 96%, 97%, 98%, 99%, or 100% amino acid sequence identity with the amino acid sequence of SEQ ID NO: 3 or 4, preferably at least 90%, further preferably at least 93%, again further preferably at least 95%, and still further preferably at least 98%, and wherein said designed ankyrin repeat domain does not have a serine (S) at the position corresponding to position 77 of SEQ ID NO: 3 or 4.

In one embodiment, said designed ankyrin repeat domain does not have an asparagine (N) at the position corresponding to position 77 of SEQ ID NO: 3 or 4 and said designed ankyrin repeat domain does not have a glutamic acid (E) at the position corresponding to position 78 of SEQ ID NO: 3 or 4. Thus, in one embodiment, said designed ankyrin repeat domain comprises an amino acid sequence that has at least 80%, 81%, 82%, 83%, 84%, 85%, 86%, 87%, 88%, 89%, 90%, 91%, 92%, 93%, 94%, 95%, 96%, 97%, 98%, 99%, or 100% amino acid sequence identity with the amino acid sequence of SEQ ID NO: 3 or 4, preferably at least 90%, further preferably at least 93%, again further preferably at least 95%, and still further preferably at least 98%, and wherein said designed ankyrin repeat domain does not have an asparagine (N) at the position corresponding to position 77 of SEQ ID NO: 3 or 4, and wherein said designed ankyrin repeat domain does not have a glutamic acid (E) at the position corresponding to position 78 of SEQ ID NO: 3 or 4.

In one embodiment, said designed ankyrin repeat domain comprises the amino acid sequence KDFAGKTPLHLAAX$_1$X$_2$G (SEQ ID NO: 13), wherein X$_1$ represents an amino acid residue selected from the group consisting of A, D and I; and X$_2$ represents an amino acid residue selected from the group consisting of A and D. Preferably, said designed ankyrin repeat domain comprises an amino acid sequence that has at least 80%, 81%, 82%, 83%, 84%, 85%, 86%, 87%, 88%, 89%, 90%, 91%, 92%, 93%, 94%, 95%, 96%, 97%, 98%, 99%, or 100% amino acid sequence identity with the amino acid sequence of SEQ ID NO: 3 or 4, preferably at least 90%, further preferably at least 93%, again further preferably at least 95%, and still further preferably at least 98%.

In one embodiment, at least one of said X$_1$ and X$_2$ is aspartic acid (D). In one embodiment, at least one of said X$_1$ and X$_2$ is alanine (A). In one embodiment, at least one of said X$_1$ and X$_2$ is aspartic acid (D), and said designed ankyrin repeat domain comprises an amino acid sequence that has at least 80%, 81%, 82%, 83%, 84%, 85%, 86%, 87%, 88%, 89%, 90%, 91%, 92%, 93%, 94%, 95%, 96%, 97%, 98%, 99%, or 100% amino acid sequence identity with the amino acid sequence of SEQ ID NO: 3 or 4, preferably at least 90%, further preferably at least 93%, again further preferably at least 95%, and still further preferably at least 98%. In one embodiment, at least one of said X$_1$ and X$_2$ is aspartic acid (D), and said designed ankyrin repeat domain differs from said SEQ ID NO: 3 or 4 by at most 9, 8, 7, 6, 5, 4, 3, 2 or one amino acid.

In one embodiment, said designed ankyrin repeat domain comprises the amino acid sequence KDFAGKTPLHLAAX$_1$X$_2$G (SEQ ID NO: 13), wherein X$_1$ and X$_2$ are each independently an amino acid residue selected from the group consisting of A and D, wherein preferably said X$_1$ and X$_2$ are not equal. Preferably, said designed ankyrin repeat domain comprises an amino acid sequence that has at least 80%, 81%, 82%, 83%, 84%, 85%, 86%, 87%, 88%, 89%, 90%, 91%, 92%, 93%, 94%, 95%, 96%, 97%, 98%, 99%, or 100% amino acid sequence identity with the amino acid sequence of SEQ ID NO: 3 or 4, preferably at least 90%, further preferably at least 93%, again further preferably at least 95%, and still further preferably at least 98%.

In one embodiment, said designed ankyrin repeat domain comprises an amino acid sequence selected from the group consisting of SEQ ID NOs: 3 to 6. In one embodiment, said designed ankyrin repeat domain comprises an amino acid sequence selected from the group consisting of SEQ ID NO: 3 or SEQ ID NO: 4. In one embodiment, said designed ankyrin repeat domain comprises the amino acid sequence of SEQ ID NO: 3. In one embodiment, said designed ankyrin repeat domain comprises the amino acid sequence of SEQ ID NO: 4. In one embodiment, said designed ankyrin repeat domain comprises the amino acid sequence of SEQ ID NO: 5. In one embodiment, said designed ankyrin repeat domain comprises the amino acid sequence of SEQ ID NO: 6.

In one embodiment, said designed ankyrin repeat domain comprises the amino acid sequence KDFAGKTPLH-LAAADG (SEQ ID NO: 14) or KDFAGKTPLHLAADAG (SEQ ID NO: 15). In one embodiment, said designed ankyrin repeat domain comprises the amino acid sequence KDFAGKTPLHLAAADG (SEQ ID NO: 14). In one embodiment, said designed ankyrin repeat domain comprises the amino acid sequence KDFAGKTPLHLAADAG (SEQ ID NO: 15). Preferably, said designed ankyrin repeat domain comprises an amino acid sequence that has at least 80%, 81%, 82%, 83%, 84%, 85%, 86%, 87%, 88%, 89%, 90%, 91%, 92%, 93%, 94%, 95%, 96%, 97%, 98%, 99%, or 100% amino acid sequence identity with the amino acid sequence of SEQ ID NO: 3 or 4, preferably at least 90%, further preferably at least 93%, again further preferably at least 95%, and still further preferably at least 98%.

In one embodiment, said designed ankyrin repeat domain comprises an amino acid sequence selected from the group consisting of SEQ ID NOs: 3 to 6, or preferably consisting of SEQ ID No: 3 and SEQ ID NO: 4, wherein up to 12, 11, 10, 9, 8, 7, 6, 5, 4, 3, 2, or 1 amino acids of SEQ ID NOs: 3 to 6, preferably of SEQ ID NO: 3 and SEQ ID NO: 4, are substituted with other amino acids. Such substitutions of amino acids are preferably such that they do not significantly affect the function, preferably the specific binding to serum albumin, of said designed ankyrin repeat domain. Such amino acid substitutions could, for example, include amino acid substitutions in designed ankyrin repeat domains, such as the ones for capping repeat domains as described in WO2012/069655. When substituting amino acids, any other amino acid can be considered as replacement amino acid. Preferably, such other amino acids are selected from the group consisting of A, D, E, F, H, I, K, L, N, P, Q, R, S, T, V, W, or Y. Preferably, such other amino acids are not C, G, or P. In some embodiments, the substitution(s) do not change the $K_D$ value of binding to human serum albumin by more than 1000-fold, more than 100-fold, or more than 10-fold, compared to the $K_D$ value of a designed ankyrin repeat domain comprising an amino acid sequence selected from the group consisting of SEQ ID NOs: 3 to 6, or preferably consisting of SEQ ID No: 3 and SEQ ID NO: 4. In certain embodiments, the substitution is a conservative substitution according to Table X. In certain embodiments, the substitution is made outside the structural core residues of the ankyrin repeat domain, e.g. in the beta loops that connect the alpha-helices. In certain embodiments, the substitution is made within the structural core residues of the ankyrin repeat domain.

TABLE X

Amino Acid Substitutions

| Original Residue | Conservative Substitutions | Exemplary Substitutions |
|---|---|---|
| Ala (A) | Val | Val; Leu; Ile |
| Arg (R) | Lys | Lys; Gln; Asn |
| Asn (N) | Gln | Gln; His; Asp, Lys; Arg |
| Asp (D) | Glu | Glu; Asn |
| Cys (C) | Ser | Ser; Ala |
| Gln (Q) | Asn | Asn; Glu |
| Glu (E) | Asp | Asp; Gln |
| Gly (G) | Ala | Ala |
| His (H) | Arg | Asn; Gln; Lys; Arg |
| Ile (I) | Leu | Leu; Val; Met; Ala; Phe; Norleucine |
| Leu (L) | Ile | Norleucine; Ile; Val; Met; Ala; Phe |
| Lys (K) | Arg | Arg; Gln; Asn |
| Met (M) | Leu | Leu; Phe; Ile |
| Phe (F) | Tyr | Leu; Val; Ile; Ala; Tyr |
| Pro (P) | Ala | Ala |
| Ser (S) | Thr | Thr |
| Thr (T) | Ser | Ser |
| Trp (W) | Tyr | Tyr; Phe |
| Tyr (Y) | Phe | Trp; Phe; Thr; Ser |
| Val (V) | Leu | Ile; Leu; Met; Phe; Ala; Norleucine |

In one embodiment, said designed ankyrin repeat domain comprises an amino acid sequence selected from the group consisting of (1) SEQ ID NO: 3, and (2) SEQ ID NO: 3, wherein up to 12, 11, 10, 9, 8, 7, 6, 5, 4, 3, 2, or 1 amino acids of SEQ ID NO: 3 in any position selected from positions 1-76 and 79-124 of SEQ ID NO: 3 are exchanged by other amino acids.

In one embodiment, the invention relates to a designed ankyrin repeat domain with binding specificity for serum albumin, wherein said designed ankyrin repeat domain comprises an amino acid sequence selected from the group consisting of (1) SEQ ID NO: 4, and (1) SEQ ID NO: 4, wherein up to 12, 11, 10, 9, 8, 7, 6, 5, 4, 3, 2, or 1 amino acids of SEQ ID NO: 4 in any position selected from positions 1-76 and 79-124 of SEQ ID NO: 4 are exchanged by other amino acids.

In all of the designed ankyrin repeat domains of the invention described above, the second last position can be "A" or "L", and/or the last position can be "A" or "N". Accordingly, in some embodiments, the designed ankyrin repeat domain comprises an amino acid sequence that is at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% identical to SEQ ID NO: 3 or 4, and wherein said designed ankyrin repeat domain does not have an asparagine (N) at the position corresponding to position 77 of SEQ ID NO: 3 or 4 and/or said designed ankyrin repeat domain does not have a glutamic acid (E) at the position corresponding to position 78 of SEQ ID NO: 3 or 4, and wherein optionally A at the second last position is substituted with L and/or A at the last position is substituted with N. Thus, in one exemplary embodiment, the designed ankyrin repeat domain comprises an amino acid sequence that is at least 80% identical to SEQ ID NO: 3 or 4, and wherein said designed ankyrin repeat domain does not have an asparagine (N) at the position corresponding to position 77 of SEQ ID NO: 3 or 4 and/or said designed ankyrin repeat domain does not have a glutamic acid (E) at the position corresponding to position 78 of SEQ ID NO: 3 or 4, and wherein optionally A at the second last position is substituted with L and/or A at the last position is substituted with N. In another exemplary embodiment, the designed ankyrin repeat domain comprises an amino acid sequence that is at least 90% identical to SEQ ID NO: 3 or 4, and wherein said designed ankyrin repeat domain does not have an asparagine (N) at the position corresponding to position 77 of SEQ ID NO: 3 or 4 and/or said designed ankyrin repeat domain does not have a glutamic acid (E) at the position corresponding to position 78 of SEQ ID NO: 3 or 4, and wherein optionally A at the second last position is substituted with L and/or A at the last position is substituted with N.

In addition, all of the designed ankyrin repeat domains of the invention described above may optionally further comprise a "G," an "S," or a "GS" sequence at its N-terminus. Accordingly, in some embodiments, the designed ankyrin repeat domain (i) comprises an amino acid sequence that is at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% identical to SEQ ID NO: 3 or 4, and wherein said designed ankyrin repeat domain does not have an asparagine (N) at the position corresponding to position 77 of SEQ ID NO: 3 or 4 and/or said designed ankyrin repeat domain does not have a glutamic acid (E) at the position corresponding to position 78 of SEQ ID NO: 3 or 4, and (ii) further comprises at its N-terminus, a G, an S, or a GS. In an exemplary embodiment, the designed ankyrin repeat domain comprises an amino acid sequence that is at least 80% identical to SEQ ID NO: 3 or 4, and wherein said designed ankyrin repeat domain does not have an asparagine (N) at the position corresponding to position 77 of SEQ ID NO: 3 or 4 and/or said designed ankyrin repeat domain does not have a glutamic acid (E) at the position corresponding to position 78 of SEQ ID NO: 3 or 4, and wherein said designed ankyrin repeat domain further comprises at its N-terminus, a G, an S, or a GS. In another exemplary embodiment, the designed ankyrin repeat domain comprises an amino acid sequence that is at least 90% identical to SEQ ID NO: 3 or 4, and wherein said designed ankyrin repeat domain does not have an asparagine (N) at the position corresponding to position 77 of SEQ ID NO: 3 or 4 and/or said designed ankyrin repeat domain does not have a glutamic acid (E) at the position corresponding to position 78 of SEQ ID NO: 3 or 4, and wherein said designed ankyrin repeat domain further comprises at its N-terminus, a G, an S, or a GS. In another exemplary embodiment, the designed ankyrin repeat domain comprises an amino acid sequence that is at least 90% identical to SEQ ID NO: 3 or 4, and wherein said designed ankyrin repeat domain does not have an asparagine (N) at the position corresponding to position 77 of SEQ ID NO: 3 or 4 and/or said designed ankyrin repeat domain does not have a glutamic acid (E) at the position corresponding to position 78 of SEQ ID NO: 3 or 4, and wherein said designed ankyrin repeat domain optionally further comprises at its N-terminus, a G, an S, or a GS, and wherein optionally A at the second last position is substituted with L and/or A at the last position is substituted with N.

In one embodiment, said designed ankyrin repeat domain consists of an amino acid sequence selected from the group consisting of SEQ ID NOs: 3 to 6. In one embodiment, said designed ankyrin repeat domain consists of an amino acid sequence selected from the group consisting of SEQ ID NO: 3 or SEQ ID NO: 4. In one embodiment, said designed ankyrin repeat domain consists of the amino acid sequence of SEQ ID NO: 3. In one embodiment, said designed ankyrin repeat domain consists of the amino acid sequence of SEQ ID NO: 4. In one embodiment, said designed ankyrin repeat domain consists of the amino acid sequence of SEQ ID NO: 5. In one embodiment, said designed ankyrin repeat domain consists of the amino acid sequence of SEQ ID NO: 6.

In one embodiment, said designed ankyrin repeat domain binds human serum albumin in PBS with a dissociation constant ($K_D$) of or below 100 nM. In one embodiment, said designed ankyrin repeat domain binds human serum albumin in PBS with a dissociation constant ($K_D$) of or below 90 nM. In one embodiment, said designed ankyrin repeat domain binds human serum albumin in PBS with a dissociation constant ($K_D$) of or below 80 nM. In one embodiment, said designed ankyrin repeat domain binds human serum albumin in PBS with a dissociation constant ($K_D$) of or below 70 nM. In one embodiment, said designed ankyrin repeat domain binds human serum albumin in PBS with a dissociation constant ($K_D$) of or below 60 nM. In one embodiment, said designed ankyrin repeat domain binds human serum albumin in PBS with a dissociation constant ($K_D$) of or below 50 nM.

In one embodiment, said designed ankyrin repeat domain has an improved stability compared to the designed ankyrin repeat domain consisting of SEQ ID NO: 2.

In on embodiment, said designed ankyrin repeat domain exhibits less degradation bands on SDS-PAGE compared to the designed ankyrin repeat domain consisting of SEQ ID NO: 2. In on embodiment, said designed ankyrin repeat domain exhibits less degradation bands on SDS-PAGE compared to the designed ankyrin repeat domain consisting of SEQ ID NO: 2, wherein said SDS-PAGE is performed following one week incubation at 100 micromolar at 60° C. at pH 5.0.

In one embodiment, said designed ankyrin repeat domain exhibits less higher molecular weight peak in size-exclusion chromatography compared to the designed ankyrin repeat domain consisting of SEQ ID NO: 2. In one embodiment, said designed ankyrin repeat domain exhibits less higher molecular weight peak in size-exclusion chromatography compared to the designed ankyrin repeat domain consisting of SEQ ID NO: 2, wherein said size-exclusion chromatography is performed following one week incubation at 100 micromolar at 60° C. at pH 5.0.

In one embodiment, said designed ankyrin repeat domain exhibits less higher molecular weight bands on SDS-PAGE compared to the designed ankyrin repeat domain consisting of SEQ ID NO: 2. In one embodiment, said designed ankyrin repeat domain exhibits less higher molecular weight bands on SDS-PAGE compared to the designed ankyrin repeat domain consisting of SEQ ID NO: 2, wherein said SDS-PAGE is performed following one week incubation at 100 micromolar at 60° C. at pH 5.0.

In one embodiment, said designed ankyrin repeat domain (i) exhibits less higher molecular weight bands on SDS-PAGE compared to the designed ankyrin repeat domain consisting of SEQ ID NO: 2 and/or (ii) exhibits less higher molecular weight peak in size-exclusion chromatography compared to the designed ankyrin repeat domain consisting of SEQ ID NO: 2. In one embodiment, said designed ankyrin repeat domain exhibits less higher molecular weight bands on SDS-PAGE compared to the designed ankyrin repeat domain consisting of SEQ ID NO: 2, wherein said SDS-PAGE is performed following one week incubation at 100 micromolar at 60° C. at pH 5.0, and/or (ii) exhibits less higher molecular weight peak in size-exclusion chromatography compared to the designed ankyrin repeat domain consisting of SEQ ID NO: 2, wherein said size-exclusion chromatography is performed following one week incubation at 100 micromolar at 60° C. at pH 5.0.

In one embodiment, said designed ankyrin repeat domain exhibits at least 10% less higher molecular weight bands in LabChip analysis compared to the designed ankyrin repeat domain consisting of SEQ ID NO: 2. In one embodiment, said designed ankyrin repeat domain exhibits at least 10% less higher molecular weight bands in LabChip analysis compared to the designed ankyrin repeat domain consisting of SEQ ID NO: 2, wherein said LabChip analysis is performed following incubation at 100 micromolar at 60° C. at pH 6.0 or 7.4.

In one embodiment, said designed ankyrin repeat domain has an improved stability compared to the designed ankyrin repeat domain consisting of SEQ ID NO: 2, wherein said improved stability compared to the designed ankyrin repeat domain consisting of SEQ ID NO: 2 is selected from the group consisting of:
  (i) the exhibition of less degradation bands on SDS-PAGE compared to the designed ankyrin repeat domain consisting of SEQ ID NO: 2, wherein preferably said SDS-PAGE is performed following one week incubation at 100 micromolar at 60° C. at pH 5.0;
  (ii) the exhibition of less higher molecular weight bands on SDS-PAGE compared to the designed ankyrin repeat domain consisting of SEQ ID NO: 2, wherein preferably said SDS-PAGE is performed following one week incubation at 100 micromolar at 60° C. at pH 5.0;
  (iii) the exhibition of less higher molecular weight peak in size-exclusion chromatography compared to the designed ankyrin repeat domain consisting of SEQ ID NO: 2, wherein preferably said size-exclusion chromatography is performed following one week incubation at 100 micromolar at 60° C. at pH 5.0; and
  (iv) the exhibition of at least 10% less higher molecular weight bands in LabChip analysis compared to the designed ankyrin repeat domain consisting of SEQ ID NO: 2, wherein preferably said LabChip analysis is performed following incubation at 100 micromolar at 60° C. at pH 6.0 or 7.4.

In one embodiment, said designed ankyrin repeat domain has an improved stability compared to the designed ankyrin repeat domain consisting of SEQ ID NO: 2, wherein said improved stability compared to the designed ankyrin repeat domain consisting of SEQ ID NO: 2 is selected from the group consisting of:
  (i) the exhibition of less degradation bands on SDS-PAGE compared to the designed ankyrin repeat domain consisting of SEQ ID NO: 2, wherein said SDS-PAGE is performed following one week incubation at 100 micromolar at 60° C. at pH 5.0;
(ii) the exhibition of less higher molecular weight bands on SDS-PAGE compared to the designed ankyrin repeat domain consisting of SEQ ID NO: 2, wherein said SDS-PAGE is performed following one week incubation at 100 micromolar at 60° C. at pH 5.0;
(iii) the exhibition of less higher molecular weight peak in size-exclusion chromatography compared to the designed ankyrin repeat domain consisting of SEQ ID NO: 2, wherein said size-exclusion chromatography is performed following one week incubation at 100 micromolar at 60° C. at pH 5.0; and
(iv) the exhibition of at least 10% less higher molecular weight bands in LabChip analysis compared to the designed ankyrin repeat domain consisting of SEQ ID NO: 2, wherein said LabChip analysis is performed following incubation at 100 micromolar at 60° C. at pH 6.0 or 7.4.

In one embodiment, said designed ankyrin repeat domain with binding specificity for serum albumin binds human serum albumin in PBST-C with an $EC_{50}$ below 1 nM. In one embodiment, said designed ankyrin repeat domain with binding specificity for serum albumin binds cynomolgus monkey serum albumin in PBST-C with an $EC_{50}$ below 20 nM. In one embodiment, said designed ankyrin repeat domain with binding specificity for serum albumin binds mouse serum albumin in PBST-C with an $EC_{50}$ below 30 nM. In one embodiment, said designed ankyrin repeat domain with binding specificity for serum albumin binds human serum albumin, cynomolgus monkey serum albumin, and mouse serum albumin in PBST-C with an $EC_{50}$ below 100 nM.

In one embodiment, the terminal half-life in mouse of said designed ankyrin repeat domain is at least 70%, preferably 75%, 80%, 85%, 90%, 95%, 96%, most preferably 97% of the terminal half-life in mouse of the designed ankyrin repeat domain consisting of SEQ ID NO: 2. In one embodiment, the terminal half-life in mouse of said designed ankyrin repeat domain differs from the terminal half-life in mouse of the designed ankyrin repeat domain consisting of SEQ ID NO: 2 by less than 30%, preferably 25%, 20%, 15%, 10%, 5%, 4%, most preferably 3%. Preferably, said terminal half-life in mouse is determined by applying said designed ankyrin repeat domain at a dose of 1 mg/kg by intravenous injection into the tail vein of Balb/c mice.

In one embodiment, the terminal half-life in cynomolgus monkey of said designed ankyrin repeat domain is at least 70%, preferably 75%, 80%, 85%, 86%, 87%, 88%, 89%, 90%, 91%, most preferably 92% of the terminal half-life in cynomolgus monkey of the designed ankyrin repeat domain consisting of SEQ ID NO: 2. In one embodiment, the terminal half-life in cynomolgus monkey of said designed ankyrin repeat domain differs from the terminal half-life in cynomolgus monkey of the designed ankyrin repeat domain consisting of SEQ ID NO: 2 by less than 30%, preferably 25%, 20%, 15%, 14%, 13%, 12%, 11%, 10%, 9%, most preferably 8%. Preferably, said terminal half-life in cynomolgus monkey is determined by applying said designed ankyrin repeat domain at a dose of 1 mg/kg by 30 min intravenous injection.

In one embodiment, said designed ankyrin repeat domain has an improved stability compared to the designed ankyrin repeat domain consisting of SEQ ID NO: 2, wherein said improved stability compared to the designed ankyrin repeat domain consisting of SEQ ID NO: 2 is the occurrence of less higher molecular weight products in SDS-PAGE analysis, typically and preferably upon incubation of the designed ankyrin repeat domain at 60° C. for one week. Preferably, said SDS-PAGE is performed following one week incubation at 100 micromolar at 60° C. at pH 5.0.

The term "higher molecular weight products" in SDS-PAGE analysis typically and preferably refers to bands that on the gel run at higher molecular weight than the expected molecular weight. In one embodiment, said higher molecular weight products in SDS-PAGE analysis refer to bands that on the gel run at molecular weight higher than 21.5 kDa. In FIG. 3, Protein #2 incubated at 60° C. for one week at pH 5, 6, or 7.4, exhibits such higher molecular weight products in SDS-PAGE that run at higher apparent molecular weight than the expected band running approximately at 14 kDa. In one embodiment, said less higher molecular weight products in SDS-PAGE analysis refer to a reduction of said higher molecular weight products by at least 5%, 10%, 15%, 20%, 25%, 30%, 35%, 40%, 45%, most preferably 50%, upon incubation at 60° C. for one week.

In one embodiment, said designed ankyrin repeat domain has an improved stability compared to the designed ankyrin repeat domain consisting of SEQ ID NO: 2, wherein said improved stability compared to the designed ankyrin repeat domain consisting of SEQ ID NO: 2 is the occurrence of less lower molecular weight products in SDS-PAGE analysis, typically and preferably upon incubation of the designed ankyrin repeat domain at 60° C. for one week. Preferably, said SDS-PAGE is performed following one week incubation at 100 micromolar at 60° C. at pH 5.0.

The term "lower molecular weight products" in SDS-PAGE analysis typically and preferably refers to bands that on the gel run at lower molecular weight than the expected molecular weight. In FIG. 3, Protein #2 incubated at 60° C. for one week at pH 5, 6, or 7.4, exhibits such lower molecular weight products in SDS-PAGE that run at lower apparent molecular weight than the expected band running approximately at 14 kDa. In one embodiment, said less lower molecular weight products in SDS-PAGE analysis refer to a reduction of said lower molecular weight products by at least 5%, 10%, 15%, 20%, 25%, 30%, 35%, 40%, 45%, most preferably 50%, upon incubation at 60° C. for one week.

Figure 4:
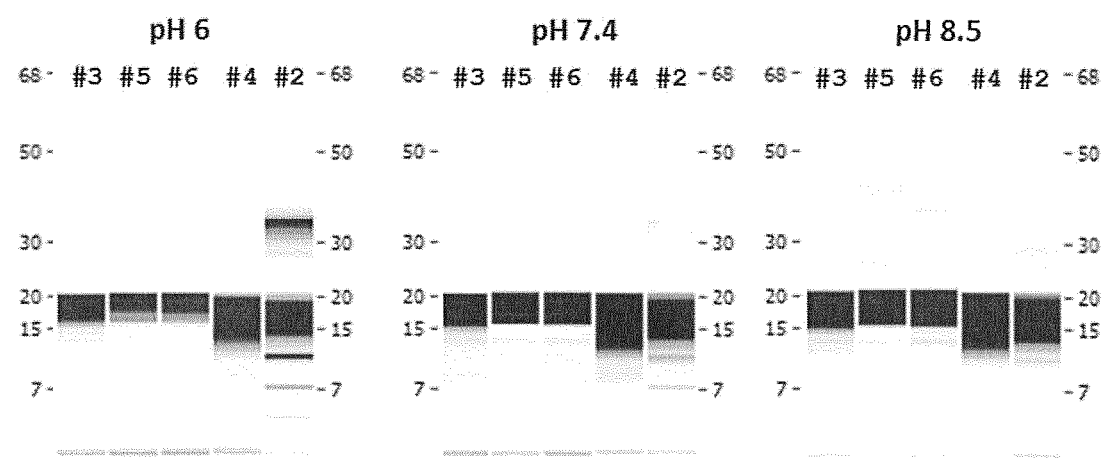
FIG. 4. LabChip analysis of the stability of designed ankyrin repeat domains with binding specificity for serum albumin. Proteins #2, #3, #4, #5, and #6 (consisting of SEQ ID NOs: 2 to 6, respectively; all additionally having SEQ ID NO: 1 at the N terminus) were produced as described in Example 2, followed by incubation at 60° C. for 1 week at pH 6, pH 7.4, and pH 8.5 as described in Example 3, followed by storage stability assessment using LabChip as described in Example 5. The LabChip data are displayed in 3 groups for the 3 different pH values. Molecular weight marker levels are indicated on the left and right of each group (in kDa).

In one embodiment, said designed ankyrin repeat domain has an improved stability compared to the designed ankyrin repeat domain consisting of SEQ ID NO: 2, wherein said improved stability compared to the designed ankyrin repeat domain consisting of SEQ ID NO: 2 is the occurrence of less higher molecular weight products in LabChip analysis, typically and preferably upon incubation of the designed ankyrin repeat domain at 60° C. for one week. In one embodiment, said higher molecular weight products in LabChip analysis refer to bands that on the chromatogram run at higher molecular weight than the expected molecular weight. In one embodiment, said higher molecular weight products in LabChip analysis refer to bands that on the chromatogram run at molecular weight higher than 30 kDa. In FIG. 4, Protein #2 incubated at 60° C. for one week at pH 6 or 7.4 exhibits such higher molecular weight products in LabChip analysis that run at higher apparent molecular weight than the expected band running approximately between 15 and 20 kDa. In one embodiment, said less higher molecular weight products in LabChip analysis refer to a reduction of said higher molecular weight products by at least 5%, 10%, 15%, 20%, 25%, 30%, 35%, 40%, 45%, most preferably 50%, upon incubation at 60° C. for one week.

In one embodiment, said designed ankyrin repeat domain has an improved stability compared to the designed ankyrin repeat domain consisting of SEQ ID NO: 2, wherein said improved stability compared to the designed ankyrin repeat domain consisting of SEQ ID NO: 2 is the occurrence of less lower molecular weight products in LabChip analysis, typically and preferably upon incubation of the designed ankyrin repeat domain at 60° C. for one week. In one embodiment, said lower molecular weight products in LabChip analysis refer to bands that on the chromatogram run at lower molecular weight than the expected molecular weight. In one embodiment, said lower molecular weight products in LabChip analysis refer to a band that on the chromatogram appears at a molecular weight of approximately 7 kDa. In FIG. 4, Protein #2 incubated at 60° C. for one week at pH 6 exhibits such lower molecular weight products in LabChip analysis that run at lower apparent molecular weight than the expected band running approximately between 15 and 20 kDa. In one embodiment, said less lower molecular weight products in LabChip analysis refer to a reduction of said lower molecular weight products by at least 5%, 10%, 15%, 20%, most preferably 25%, upon incubation at 60° C. for one week.

In one embodiment, said designed ankyrin repeat domain has an improved stability compared to the designed ankyrin repeat domain consisting of SEQ ID NO: 2, wherein said improved stability compared to the designed ankyrin repeat domain consisting of SEQ ID NO: 2 is the occurrence of lower amounts of higher molecular weight products in size-exclusion chromatography, typically and preferably upon incubation at 60° C. for one week at pH 5. In one embodiment, the term "higher molecular weight products" in size-exclusion chromatography typically and preferably refers to products that elute prior to the expected molecular weight product. In FIG. 5c, Protein #2 incubated at 60° C. for one week at pH 5 exhibits such higher molecular weight product eluting at 4.1 minutes in size exclusion chromatography, whereas the expected molecular weight product elutes approximately after 4.6 minutes. In one embodiment, said lower amounts of higher molecular weight products in size-exclusion chromatography refer to a reduction of the percentage of total area under the curve by at least 5%, 10%, 15%, 20%, most preferably 25% of the total area under the curve, upon incubation at 60° C. for one week.

In one embodiment, said incubation refers to incubation at pH 8.5, 7.4, 6, or 5. In one embodiment, said incubation refers to incubation at pH 8.5. In one embodiment, the term "incubation" refers to incubation at pH 7.4. In one embodiment, said incubation refers to incubation at pH 6. In one embodiment, said incubation refers to incubation at pH 5. In one embodiment, said incubation at pH 8.5 refers to an incubation in phosphate/citrate/borate buffer. In one embodiment, said incubation at pH 7.4 refers to an incubation in PBS. In one embodiment, said incubation at pH 6 refers to an incubation in phosphate/citrate buffer pH 6. In one embodiment, said incubation at pH 5 refers to an incubation in phosphate/citrate buffer pH 5.

In another aspect, the invention further provides a recombinant binding protein comprising at least one inventive designed ankyrin repeat domain with binding specificity for serum albumin. The preferred embodiments and features as described above and herein for the inventive designed ankyrin repeat domain apply to any and all aspects of the present invention including the inventive recombinant binding protein comprising at least one inventive designed ankyrin repeat domain with binding specificity for serum albumin.

In one embodiment, said recombinant binding protein comprises one or two of the inventive designed ankyrin repeat domains. In one embodiment, said recombinant binding protein comprises exactly one or exactly two of the inventive designed ankyrin repeat domains. In one embodiment, said recombinant binding protein comprises exactly two of the inventive designed ankyrin repeat domains. In one embodiment, said recombinant binding protein comprises three of the inventive designed ankyrin repeat domains.

In one embodiment, said recombinant binding protein comprises one or two of the inventive designed ankyrin repeat domains, wherein each of said one or two ankyrin repeat domains independently comprises an amino acid sequence that has at least 80% sequence identity with the amino acid sequence of SEQ ID NO: 3 or 4, and wherein each of said designed ankyrin repeat domains does not have an asparagine (N) at the position corresponding to position 77 of SEQ ID NO: 3 or 4 and/or does not have a glutamic acid (E) at the position corresponding to position 78 of SEQ ID NO: 3 or 4. In one embodiment, said recombinant binding protein comprises exactly one or exactly two of the inventive designed ankyrin repeat domains, wherein each of said one or two ankyrin repeat domains independently comprises an amino acid sequence that has at least 80% sequence identity with the amino acid sequence of SEQ ID NO: 3 or 4, and wherein each of said designed ankyrin repeat domains does not have an asparagine (N) at the position corresponding to position 77 of SEQ ID NO: 3 or 4 and/or does not have a glutamic acid (E) at the position corresponding to position 78 of SEQ ID NO: 3 or 4. In one embodiment, said recombinant binding protein comprises exactly two of the inventive designed ankyrin repeat domains, wherein each of said two ankyrin repeat domains independently comprises an amino acid sequence that has at least 80% sequence identity with the amino acid sequence of SEQ ID NO: 3 or 4, and wherein each of said designed ankyrin repeat domains does not have an asparagine (N) at the position corresponding to position 77 of SEQ ID NO: 3 or 4 and/or does not have a glutamic acid (E) at the position corresponding to position 78 of SEQ ID NO: 3 or 4.

In one embodiment, said recombinant binding protein comprises one or two of the inventive designed ankyrin repeat domains, wherein each of said one or two ankyrin repeat domains independently comprises an amino acid sequence that has at least 90% sequence identity with the amino acid sequence of SEQ ID NO: 3 or 4. In one embodiment, said recombinant binding protein comprises exactly one or exactly two of the inventive designed ankyrin repeat domains, wherein each of said one or two ankyrin repeat domains independently comprises an amino acid sequence that has at least 90% sequence identity with the amino acid sequence of SEQ ID NO: 3 or 4. In one embodiment, said recombinant binding protein comprises exactly two of the inventive designed ankyrin repeat domains wherein each of said two ankyrin repeat domains independently comprises an amino acid sequence that has at least 90% sequence identity with the amino acid sequence of SEQ ID NO: 3 or 4. In one embodiment, said amino acid sequence identity with the amino acid sequence of SEQ ID NO: 3 or 4 is at least 93%, further preferably at least 95%, and again further preferably at least 98%.

In one embodiment, said recombinant binding protein comprises one or two of the inventive designed ankyrin repeat domains, wherein each of said one or two ankyrin repeat domains independently comprises an amino acid sequence selected from the group consisting of SEQ ID NOs: 3 to 6. In one embodiment, said recombinant binding protein comprises exactly one or exactly two of the inventive designed ankyrin repeat domains, wherein each of said one or two ankyrin repeat domains independently comprises an amino acid sequence selected from the group consisting of SEQ ID NOs: 3 to 6. In one embodiment, said recombinant binding protein comprises exactly two of the inventive designed ankyrin repeat domains wherein each of said two ankyrin repeat domains independently comprises an amino acid sequence selected from the group consisting of SEQ ID NOs: 3 to 6.

In one embodiment, said recombinant binding protein comprises one or two of the inventive designed ankyrin repeat domains, wherein each of said one or two ankyrin repeat domains independently comprises an amino acid sequence of SEQ ID NO: 3 or 4. In one embodiment, said recombinant binding protein comprises exactly one or exactly two of the inventive designed ankyrin repeat domains, wherein each of said one or two ankyrin repeat domains independently comprises an amino acid sequence of SEQ ID NO: 3 or 4. In one embodiment, said recombinant binding protein comprises exactly two of the inventive designed ankyrin repeat domains wherein each of said two ankyrin repeat domains independently comprises an amino acid sequence of SEQ ID NO: 3 or 4.

In one embodiment, said recombinant binding protein comprises one or two of the inventive designed ankyrin repeat domains with binding specificity for serum albumin, wherein said recombinant binding protein binds human serum albumin in PBS with a dissociation constant ($K_D$) of or below 100 nM. In one embodiment, said recombinant binding protein comprises exactly one or exactly two of the inventive designed ankyrin repeat domains with binding specificity for serum albumin, wherein said recombinant binding protein binds human serum albumin in PBS with a dissociation constant ($K_D$) of or below 100 nM. In one embodiment, said recombinant binding protein comprises exactly two of the inventive designed ankyrin repeat domains with binding specificity for serum albumin, wherein said recombinant binding protein binds human serum albumin in PBS with a dissociation constant ($K_D$) of or below 100 nM. In one embodiment, said recombinant binding protein binds human serum albumin in PBS with a dissociation constant ($K_D$) of or below 90 nM. In one embodiment, said recombinant binding protein binds human serum albumin in PBS with a dissociation constant ($K_D$) of or below 80 nM. In one embodiment, said recombinant binding protein binds human serum albumin in PBS with a dissociation constant ($K_D$) of or below 70 nM. In one embodiment, said recombinant binding protein binds human serum albumin in PBS with a dissociation constant ($K_D$) of or below 60 nM. In one embodiment, said recombinant binding protein binds human serum albumin in PBS with a dissociation constant ($K_D$) of or below 50 nM.

In one embodiment, said recombinant binding protein comprises at least two designed ankyrin repeat domains with binding specificity for serum albumin, wherein each of said designed ankyrin repeat domains with binding specificity for serum albumin has an improved stability compared to the designed ankyrin repeat domain consisting of SEQ ID NO: 2. SEQ ID NOs: 9 to 12 are examples of such recombinant binding proteins. In one embodiment, the invention relates to a recombinant binding protein comprising two, preferably exactly two, designed ankyrin repeat domains with binding specificity for serum albumin, wherein each of said designed ankyrin repeat domains with binding specificity for serum albumin has an improved stability compared to the designed ankyrin repeat domain consisting of SEQ ID NO: 2. SEQ ID NOs: 9 to 12 are examples of such recombinant binding proteins.

In one embodiment, said recombinant binding protein comprises two, preferably exactly two, designed ankyrin repeat domains with binding specificity for serum albumin, wherein each of said designed ankyrin repeat domains with binding specificity for serum albumin consists of SEQ ID NO: 3. SEQ ID NOs: 9 and 10 are examples of such recombinant binding proteins. In one embodiment, said recombinant binding protein comprises two, preferably exactly two, designed ankyrin repeat domains with binding specificity for serum albumin, wherein each of said designed ankyrin repeat domains with binding specificity for serum albumin consists of SEQ ID NO: 4. SEQ ID NOs: 11 and 12 are examples of such recombinant binding proteins.

In one embodiment, said recombinant binding protein comprises one or two of the inventive designed ankyrin repeat domains, wherein each of said one or two ankyrin repeat domains independently comprises an amino acid sequence selected from the group consisting of SEQ ID NOs: 3 to 6, and wherein said recombinant binding protein binds human serum albumin in PBS with a dissociation constant ($K_D$) of or below 100 nM. In one embodiment, said recombinant binding protein comprises exactly one or exactly two of the inventive designed ankyrin repeat domains, wherein each of said one or two ankyrin repeat domains independently comprises an amino acid sequence selected from the group consisting of SEQ ID NOs: 3 to 6, and wherein said recombinant binding protein binds human serum albumin in PBS with a dissociation constant ($K_D$) of or below 100 nM. In one embodiment, said recombinant binding protein comprises exactly two of the inventive designed ankyrin repeat domains wherein each of said two ankyrin repeat domains independently comprises an amino acid sequence selected from the group consisting of SEQ ID NOs: 3 to 6, and wherein said recombinant binding protein binds human serum albumin in PBS with a dissociation constant ($K_D$) of or below 100 nM. In one embodiment, said recombinant binding protein binds human serum albumin in PBS with a dissociation constant ($K_D$) of or below 90 nM. In one embodiment, said recombinant binding protein binds human serum albumin in PBS with a dissociation constant ($K_D$) of or below 80 nM. In one embodiment, said recombinant binding protein binds human serum albumin in PBS with a dissociation constant ($K_D$) of or below 70 nM. In one embodiment, said recombinant binding protein binds human serum albumin in PBS with a dissociation constant ($K_D$) of or below 60 nM. In one embodiment, said recombinant binding protein binds human serum albumin in PBS with a dissociation constant ($K_D$) of or below 50 nM.

In one embodiment, said recombinant binding protein comprises one or two of the inventive designed ankyrin repeat domains, wherein each of said one or two ankyrin repeat domains independently comprises an amino acid sequence of SEQ ID NO: 3 or 4, and wherein said recombinant binding protein binds human serum albumin in PBS with a dissociation constant ($K_D$) of or below 100 nM. In one embodiment, said recombinant binding protein comprises exactly one or exactly two of the inventive designed ankyrin repeat domains, wherein each of said one or two ankyrin repeat domains independently comprises an amino acid sequence of SEQ ID NO: 3 or 4, and wherein said recombinant binding protein binds human serum albumin in PBS with a dissociation constant ($K_D$) of or below 100 nM. In one embodiment, said recombinant binding protein comprises exactly two of the inventive designed ankyrin repeat domains wherein each of said two ankyrin repeat domains independently comprises an amino acid sequence of SEQ ID NO: 3 or 4, and wherein said recombinant binding protein binds human serum albumin in PBS with a dissociation constant ($K_D$) of or below 100 nM. In one embodiment, said recombinant binding protein binds human serum albumin in PBS with a dissociation constant ($K_D$) of or below 90 nM. In one embodiment, said recombinant binding protein binds human serum albumin in PBS with a dissociation constant ($K_D$) of or below 80 nM. In one embodiment, said recombinant binding protein binds human serum albumin in PBS with a dissociation constant ($K_D$) of or below 70 nM. In one embodiment, said recombinant binding protein binds human serum albumin in PBS with a dissociation constant ($K_D$) of or below 60 nM. In one embodiment, said recombinant binding protein binds human serum albumin in PBS with a dissociation constant ($K_D$) of or below 50 nM.

In one embodiment, said recombinant binding protein comprises one or two of the inventive designed ankyrin repeat domains, wherein each of said one or two ankyrin repeat domains independently comprises an amino acid sequence of SEQ ID NO: 3 or 4, and wherein said recombinant binding protein binds human serum albumin in PBS with a dissociation constant ($K_D$) of or below 100 nM, and wherein each of said one or two ankyrin repeat domains has an improved stability compared to the designed ankyrin repeat domain consisting of SEQ ID NO: 2, and wherein said improved stability compared to the designed ankyrin repeat domain consisting of SEQ ID NO: 2 is selected from the group consisting of (i) the exhibition of less degradation bands on SDS-PAGE compared to the designed ankyrin repeat domain consisting of SEQ ID NO: 2, wherein said SDS-PAGE is performed following one week incubation at 100 micromolar at 60° C. at pH 5.0; (ii) the exhibition of less higher molecular weight bands on SDS-PAGE compared to the designed ankyrin repeat domain consisting of SEQ ID NO: 2, wherein said SDS-PAGE is performed following one week incubation at 100 micromolar at 60° C. at pH 5.0; (iii) the exhibition of less higher molecular weight peak in size-exclusion chromatography compared to the designed ankyrin repeat domain consisting of SEQ ID NO: 2, wherein said size-exclusion chromatography is performed following one week incubation at 100 micromolar at 60° C. at pH 5.0; and (iv) the exhibition of at least 10% less higher molecular weight bands in LabChip analysis compared to the designed ankyrin repeat domain consisting of SEQ ID NO: 2, wherein said LabChip analysis is performed following incubation at 100 micromolar at 60° C. at pH 6.0 or 7.4. In one embodiment, said recombinant binding protein comprises exactly one or exactly two of the inventive designed ankyrin repeat domains, wherein each of said one or two ankyrin repeat domains independently comprises an amino acid sequence of SEQ ID NO: 3 or 4, and wherein said recombinant binding protein binds human serum albumin in PBS with a dissociation constant ($K_D$) of or below 100 nM, and wherein each of said one or two ankyrin repeat domains has an improved stability compared to the designed ankyrin repeat domain consisting of SEQ ID NO: 2, and wherein said improved stability compared to the designed ankyrin repeat domain consisting of SEQ ID NO: 2 is selected from the group consisting of (i) the exhibition of less degradation bands on SDS-PAGE compared to the designed ankyrin repeat domain consisting of SEQ ID NO: 2, wherein said SDS-PAGE is performed following one week incubation at 100 micromolar at 60° C. at pH 5.0; (ii) the exhibition of less higher molecular weight bands on SDS-PAGE compared to the designed ankyrin repeat domain consisting of SEQ ID NO: 2, wherein said SDS-PAGE is performed following one week incubation at 100 micromolar at 60° C. at pH 5.0; (iii) the exhibition of less higher molecular weight peak in size-exclusion chromatography compared to the designed ankyrin repeat domain consisting of SEQ ID NO: 2, wherein said size-exclusion chromatography is performed following one week incubation at 100 micromolar at 60° C. at pH 5.0; and (iv) the exhibition of at least 10% less higher molecular weight bands in LabChip analysis compared to the designed ankyrin repeat domain consisting of SEQ ID NO: 2, wherein said LabChip analysis is performed following incubation at 100 micromolar at 60° C. at pH 6.0 or 7.4. In one embodiment, said recombinant binding protein comprises exactly two of the inventive designed ankyrin repeat domains, wherein each of said two ankyrin repeat domains independently comprises an amino acid sequence of SEQ ID NO: 3 or 4, and wherein said recombinant binding protein binds human serum albumin in PBS with a dissociation constant ($K_D$) of or below 100 nM, and wherein each of said two ankyrin repeat domains has an improved stability compared to the designed ankyrin repeat domain consisting of SEQ ID NO: 2, and wherein said improved stability compared to the designed ankyrin repeat domain consisting of SEQ ID NO: 2 is selected from the group consisting of (i) the exhibition of less degradation bands on SDS-PAGE compared to the designed ankyrin repeat domain consisting of SEQ ID NO: 2, wherein said SDS-PAGE is performed following one week incubation at 100 micromolar at 60° C. at pH 5.0; (ii) the exhibition of less higher molecular weight bands on SDS-PAGE compared to the designed ankyrin repeat domain consisting of SEQ ID NO: 2, wherein said SDS-PAGE is performed following one week incubation at 100 micromolar at 60° C. at pH 5.0; (iii) the exhibition of less higher molecular weight peak in size-exclusion chromatography compared to the designed ankyrin repeat domain consisting of SEQ ID NO: 2, wherein said size-exclusion chromatography is performed following one week incubation at 100 micromolar at 60° C. at pH 5.0; and (iv) the exhibition of at least 10% less higher molecular weight bands in LabChip analysis compared to the designed ankyrin repeat domain consisting of SEQ ID NO: 2, wherein said LabChip analysis is performed following incubation at 100 micromolar at 60° C. at pH 6.0 or 7.4. In one embodiment, said recombinant binding protein binds human serum albumin in PBS with a dissociation constant ($K_D$) of or below 90 nM. In one embodiment, said recombinant binding protein binds human serum albumin in PBS with a dissociation constant ($K_D$) of or below 80 nM. In one embodiment, said recombinant binding protein binds human serum albumin in PBS with a dissociation constant ($K_D$) of or below 70 nM. In one embodiment, said recombinant binding protein binds human serum albumin in PBS with a dissociation constant ($K_D$) of or below 60 nM. In one embodiment, said recombinant binding protein binds human serum albumin in PBS with a dissociation constant ($K_D$) of or below 50 nM.

In one embodiment, said recombinant binding protein has an improved stability compared to a recombinant binding protein with identical amino acid sequence except that each of said designed ankyrin repeat domains with binding specificity for serum albumin is substituted with a designed ankyrin repeat domain consisting of SEQ ID NO: 2. SEQ ID NOs: 9 to 12 are examples of such recombinant binding proteins.

Recombinant binding proteins consisting of SEQ ID NOs: 9 or 11 are examples of such recombinant binding proteins that exhibit improved stability compared to a recombinant binding protein consisting of SEQ ID NO: 7, which comprises two designed ankyrin repeat domains with binding specificity for serum albumin, each consisting of SEQ ID NO: 2. Recombinant binding proteins consisting of SEQ ID NOs: 10 or 12 are examples of such recombinant binding proteins that exhibit improved stability compared to a recombinant binding protein consisting of SEQ ID NO: 8, which comprises two designed ankyrin repeat domains with binding specificity for serum albumin, each consisting of SEQ ID NO: 2.

In one embodiment, said recombinant binding protein comprises one or two of the inventive designed ankyrin repeat domains, wherein each of said one or two ankyrin repeat domains independently comprises the amino acid sequence of SEQ ID NO: 3. In one embodiment, said recombinant binding protein comprises exactly one or exactly two of the inventive designed ankyrin repeat domains, wherein each of said one or two ankyrin repeat domains independently comprises the amino acid sequence of SEQ ID NO: 3. In one embodiment, said recombinant binding protein comprises exactly two of the inventive designed ankyrin repeat domains, wherein each of said two ankyrin repeat domains independently comprises the amino acid sequence of SEQ ID NO: 3.

In one embodiment, said recombinant binding protein comprises one or two of the inventive designed ankyrin repeat domains, wherein each of said one or two ankyrin repeat domains independently comprises the amino acid sequence of SEQ ID NO: 4. In one embodiment, said recombinant binding protein comprises exactly one or exactly two of the inventive designed ankyrin repeat domains, wherein each of said one or two ankyrin repeat domains independently comprises the amino acid sequence of SEQ ID NO: 4. In one embodiment, said recombinant binding protein comprises exactly two of the inventive designed ankyrin repeat domains wherein each of said two ankyrin repeat domains independently comprises the amino acid sequence of SEQ ID NO: 4.

In one embodiment, said recombinant binding protein comprises an amino acid sequence selected from the group consisting of SEQ ID NOs: 9 to 12. In one embodiment, said recombinant binding protein comprises, preferably consists of, the amino acid sequence of SEQ ID NO: 9. In one embodiment, said recombinant binding protein comprises, preferably consists of, the amino acid sequence of SEQ ID NO: 10. In one embodiment, said recombinant binding protein comprises, preferably consists of, the amino acid sequence of SEQ ID NO: 11. In one embodiment, said recombinant binding protein comprises, preferably consists of, the amino acid sequence of SEQ ID NO: 12.

In one embodiment, the terminal half-life in mouse of said recombinant binding protein is at least 70%, preferably at least 75%, 80%, 85%, 86%, 87%, 88%, 89%, most preferably at least 90% of the terminal half-life in mouse of a recombinant binding protein with identical amino acid sequence except that each of said designed ankyrin repeat domains with binding specificity for serum albumin is substituted with a designed ankyrin repeat domain consisting of SEQ ID NO: 2. In one embodiment, the terminal half-life in mouse of said recombinant binding protein differs by less than 30%, preferably less than 25%, 20%, 19%, 18%, 17%, 16%, 15%, most preferably less than 10%, from the terminal half-life in mouse of a recombinant binding protein with identical amino acid sequence except that each of said designed ankyrin repeat domains with binding specificity for serum albumin is substituted with a designed ankyrin repeat domain consisting of SEQ ID NO: 2. Preferably, said terminal half-life in mouse is determined by applying said recombinant binding protein at a dose of 1 mg/kg by intravenous injection into the tail vein of Balb/c mice.

In one embodiment, the terminal half-life in cynomolgus monkey of said recombinant binding protein is at least 70%, preferably less than 75%, 80%, 85%, 86%, 87%, 88%, 89%, 90%, 91%, most preferably 92% of the terminal half-life in cynomolgus monkey of a recombinant binding protein with identical amino acid sequence except that each of said designed ankyrin repeat domains with binding specificity for serum albumin is substituted with a designed ankyrin repeat domain consisting of SEQ ID NO: 2. In one embodiment, the terminal half-life in cynomolgus monkey of said recombinant binding protein differs by less than 30%, preferably less than 25%, 20%, 15%, 14%, 13%, 12%, 11%, 10%, 9%, most preferably less than 8%, from the terminal half-life in cynomolgus monkey of a recombinant binding protein with identical amino acid sequence except that each of said designed ankyrin repeat domains with binding specificity for serum albumin is substituted with a designed ankyrin repeat domain consisting of SEQ ID NO: 2. Preferably, said terminal half-life in cynomolgus monkey is determined by applying said recombinant binding protein at a dose of 1 mg/kg by 30 min intravenous injection.

In another aspect, the invention relates to a nucleic acid encoding the amino acid sequence of an ankyrin repeat domain or a recombinant binding protein of the present invention. In one embodiment, the invention relates to a nucleic acid encoding the amino acid sequence of an ankyrin repeat domain of the present invention. In one embodiment, the invention relates to a nucleic acid encoding the amino acid sequence of a recombinant binding protein of the present invention. In one embodiment, the invention relates to a nucleic acid encoding an amino acid sequence selected from the group consisting of SEQ ID NO: 3 to 6. In one embodiment, the invention relates to a nucleic acid encoding an amino acid sequence selected from the group consisting of SEQ ID NO: 9 to 12. In one embodiment, the invention relates to a nucleic acid encoding the amino acid sequence of SEQ ID NO: 3. In one embodiment, the invention relates to a nucleic acid encoding the amino acid sequence of SEQ ID NO: 4. In one embodiment, the invention relates to a nucleic acid encoding the amino acid sequence of SEQ ID NO: 5. In one embodiment, the invention relates to a nucleic acid encoding the amino acid sequence of SEQ ID NO: 6. In one embodiment, the invention relates to a nucleic acid encoding the amino acid sequence of SEQ ID NO: 9. In one embodiment, the invention relates to a nucleic acid encoding the amino acid sequence of SEQ ID NO: 10. In one embodiment, the invention relates to a nucleic acid encoding the amino acid sequence of SEQ ID NO: 11. In one embodiment, the invention relates to a nucleic acid encoding the amino acid sequence of SEQ ID NO: 12. Furthermore, the invention relates to a vector comprising any of said nucleic acids.

In a further aspect, the invention relates to a pharmaceutical composition comprising a recombinant binding protein and/or a designed ankyrin repeat domain of the present invention, and/or a nucleic acid encoding a recombinant binding protein and/or a designed ankyrin repeat domain of the present invention, and optionally a pharmaceutically acceptable carrier and/or diluent. Pharmaceutically acceptable carriers and/or diluents are known to the person skilled in the art and are explained in more detail below. Even further, a diagnostic composition comprising one or more of the herein mentioned recombinant binding proteins and/or designed ankyrin repeat domains is provided.

A pharmaceutical composition comprises binding proteins as described above and a pharmaceutically acceptable carrier, excipient or stabilizer, for example as described in Remington's Pharmaceutical Sciences 16$^{th}$ edition, Osol, A. Ed., 1980. Suitable carriers, excipients or stabilizers known to one of skill in the art include, for example, saline, Ringer's solution, dextrose solution, Hank's solution, fixed oils, ethyl oleate, 5% dextrose in saline, substances that enhance isotonicity and chemical stability, buffers and preservatives. Other suitable carriers include any carrier that does not itself induce the production of antibodies harmful to the individual receiving the composition such as proteins, polysaccharides, polylactic acids, polyglycolic acids, polymeric amino acids and amino acid copolymers. A pharmaceutical composition may also be a combination formulation, comprising an additional active agent, such as an anti-cancer agent or an anti-angiogenic agent.

The formulations to be used for in vivo administration must be aseptic or sterile. This is readily accomplished by filtration through sterile filtration membranes.

The pharmaceutical composition may be administered by any suitable method within the knowledge of the skilled man. The preferred route of administration is parenterally. In parenteral administration, the medicament of this invention will be formulated in a unit dosage injectable form such as a solution, suspension or emulsion, in association with the pharmaceutically acceptable excipients as defined above. The dosage and mode of administration will depend on the individual to be treated and the particular disease.

Further, any of the above mentioned pharmaceutical compositions is considered for the treatment of a disease or disorder. The invention further provides methods of treatment. The method comprises administering, to a patient in need thereof, a therapeutically effective amount of a pharmaceutical composition or of a recombinant binding protein or of a designed ankyrin repeat domain of the invention.

Further, a method of treating a pathological condition in a mammal, including man, comprising administering to a patient in need thereof an effective amount of the above mentioned pharmaceutical composition is provided.

The disclosure provides a method of treating cancer, comprising administering to a subject in need thereof a therapeutically effective amount of a recombinant binding protein or a pharmaceutical composition described herein. In certain embodiments, the subject is a human. In certain embodiments, the cancer is a solid tumor. SEQ ID NOs: 9 to 12 are examples of recombinant binding proteins that are useful in such methods of treating cancer In some embodiments, the cancer is brain cancer, bladder cancer, breast cancer, clear cell kidney cancer, cervical cancer, colon and rectal cancer, endometrial cancer, gastric cancer, head/neck squamous cell carcinoma, lip and oral cancer, liver cancer, lung squamous cell carcinoma, melanoma, mesothelioma, non-small-cell lung cancer (NSCLC), non-melanoma skin cancer, ovarian cancer, oral cancer, pancreatic cancer, prostate cancer, renal cell carcinoma, sarcoma, small-cell lung cancer (SCLC), Squamous Cell Carcinoma of the Head and Neck (SCCHN), triple negative breast cancer, or thyroid cancer.

The invention is not restricted to the particular embodiments described in the Examples. Other sources may be used and processed following the general outline described below.

This specification refers to a number of amino acid sequences of the amino acid sequence listing of this specification named "P5754_Sequence_Protocol.txt" and the amino acid sequences of the sequence protocol are herewith incorporated by reference.

Definitions

Unless defined otherwise herein, all technical and scientific terms used herein shall have the meanings that are commonly understood by those of ordinary skill in the art to which the present invention belongs.

In the context of the present invention the term "protein" refers to a molecule comprising a polypeptide, wherein at least part of the polypeptide has, or is able to acquire, a defined three-dimensional arrangement by forming secondary, tertiary, and/or quaternary structures within a single polypeptide chain and/or between multiple polypeptide chains. If a protein comprises two or more polypeptide chains, the individual polypeptide chains may be linked non-covalently or covalently, e.g. by a disulfide bond between two polypeptides. A part of a protein, which individually has, or is able to acquire, a defined three-dimensional arrangement by forming secondary and/or tertiary structure, is termed "protein domain". Such protein domains are well known to the practitioner skilled in the art.

The term "recombinant" as used in recombinant protein, recombinant polypeptide and the like, means that said protein or polypeptide is produced by the use of recombinant DNA technologies well known to the practitioner skilled in the art. For example, a recombinant DNA molecule (e.g. produced by gene synthesis) encoding a polypeptide can be cloned into a bacterial expression plasmid (e.g. pQE30, QIAgen), yeast expression plasmid, mammalian expression plasmid, or plant expression plasmid, or a DNA enabling in vitro expression. If, for example, such a recombinant bacterial expression plasmid is inserted into appropriate bacteria (e.g. *Escherichia coli*), these bacteria can produce the polypeptide(s) encoded by this recombinant DNA. The correspondingly produced polypeptide or protein is called a recombinant polypeptide or recombinant protein.

In the context of the present invention, the term "binding protein" refers to a protein comprising a binding domain. A binding protein may also comprise two, three, four, five or more binding domains. Preferably, said binding protein is a recombinant binding protein. Binding proteins of the instant invention comprise an ankyrin repeat domain with binding specificity for serum albumin.

Furthermore, any such binding protein may comprise additional polypeptides (such as e.g. polypeptide tags, peptide linkers, fusion to other proteinaceous domains with binding specificity, cytokines, hormones, or antagonists), or chemical modifications (such as coupling to polyethyleneglycol, toxins (e.g. DM1 from Immunogen), small molecules, antibiotics and alike) well known to the person skilled in the art.

The term "binding domain" means a protein domain exhibiting binding specificity for a target. Preferably, said binding domain is a recombinant binding domain.

The term "target" refers to an individual molecule such as a nucleic acid molecule, a polypeptide or protein, a carbohydrate, or any other naturally occurring molecule, including any part of such individual molecule, or to complexes of two or more of such molecules, or to a whole cell or a tissue sample, or to any non-natural compound.

Preferably, a target is a naturally occurring or non-natural polypeptide or protein, or a polypeptide or protein containing chemical modifications, for example, naturally occurring or non-natural phosphorylation, acetylation, or methylation.

For example, in the context of the present invention, serum albumin is a target of the disclosed serum albumin-specific binding domains and proteins.

In the context of the present invention, the term "polypeptide" relates to a molecule consisting of a chain of multiple, i.e. two or more, amino acids linked via peptide bonds. Preferably, a polypeptide consists of more than eight amino acids linked via peptide bonds. The term "polypeptide" also includes multiple chains of amino acids, linked together by S—S bridges of cysteines. Polypeptides are well-known to the person skilled in the art.

Patent application WO2002/020565 and Forrer et al., 2003 (Forrer, P., Stumpp, M. T., Binz, H. K., Plückthun, A., 2003. FEBS Letters 539, 2-6), contain a general description of repeat protein features and repeat domain features, techniques and applications. The term "repeat protein" refers to a protein comprising one or more repeat domains. Preferably, a repeat protein comprises one, two, three, four, five or six repeat domains. Furthermore, said repeat protein may comprise additional non-repeat protein domains, polypeptide tags and/or peptide linkers. The repeat domains can be binding domains.

The term "repeat domain" refers to a protein domain comprising two or more consecutive repeat modules as structural units, wherein said repeat modules have structural and sequence homology. Preferably, a repeat domain further comprises an N-terminal and/or a C-terminal capping module. For clarity, a capping module can be a repeat module. Such repeat domains, repeat modules, and capping modules, sequence motives, as well as structural homology and sequence homology are well known to the practitioner in the art from examples of ankyrin repeat domains (WO2002/020565), leucine-rich repeat domains (WO2002/020565), tetratricopeptide repeat domains (Main, E. R., Xiong, Y., Cocco, M. J., D'Andrea, L., Regan, L., Structure 11(5), 497-508, 2003), and armadillo repeat domains (WO2009/040338). It is further well known to the practitioner in the art, that such repeat domains are different from proteins comprising repeated amino acid sequences, where every repeated amino acid sequence is able to form an individual domain (for example FN3 domains of Fibronectin).

The term "designed" as used in designed repeat protein, designed repeat domain and the like refers to the property that such repeat proteins and repeat domains, respectively, are man-made and do not occur in nature. The binding proteins of the instant invention are designed repeat proteins and they comprise at least one designed ankyrin repeat domain.

The term "target interaction residues" refers to amino acid residues of a repeat module, which contribute to the direct interaction with a target.

The term "framework residues" refers to amino acid residues of a repeat module, which contribute to the folding topology, i.e. which contribute to the fold of said repeat module or which contribute to the interaction with a neighboring module. Such contribution may be the interaction with other residues in the repeat module, or the influence on the polypeptide backbone conformation as found in α-helices or β-sheets, or the participation in amino acid stretches forming linear polypeptides or loops.

Such framework and target interaction residues may be identified by analysis of the structural data obtained by physicochemical methods, such as X-ray crystallography, NMR and/or CD spectroscopy, or by comparison with known and related structural information well known to practitioners in structural biology and/or bioinformatics.

The term "repeat modules" refers to the repeated amino acid sequence and structural units of the designed repeat domains, which are originally derived from the repeat units of naturally occurring repeat proteins. Each repeat module comprised in a repeat domain is derived from one or more repeat units of a family or subfamily of naturally occurring repeat proteins, e.g. the family of ankyrin repeat proteins. Furthermore, each repeat module comprised in a repeat domain may comprise a "repeat sequence motif" deduced from homologous repeat modules obtained from repeat domains selected on a target, e.g. as described in Example 1, and having the same target specificity.

Accordingly, the term "ankyrin repeat module" refers to a repeat module, which is originally derived from the repeat units of naturally occurring ankyrin repeat proteins. Ankyrin repeat proteins are well known to the person skilled in the art.

Repeat modules may comprise positions with amino acid residues which have not been randomized in a library for the purpose of selecting target-specific repeat domains ("non-randomized positions") and positions with amino acid residues which have been randomized in the library for the purpose of selecting target-specific repeat domains ("randomized positions"). The non-randomized positions comprise framework residues. The randomized positions comprise target interaction residues. "Have been randomized" means that two or more amino acids were allowed at an amino acid position of a repeat module, for example, wherein any of the usual twenty naturally occurring amino acids were allowed, or wherein most of the twenty naturally occurring amino acids were allowed, such as amino acids other than cysteine, or amino acids other than glycine, cysteine and proline. For the purpose of this patent application, amino acid residues 3, 4, 6, 14 and 15 of SEQ ID NOs: 2 to 6 are randomized positions of the ankyrin repeat modules of the instant invention.

The term "repeat sequence motif" refers to an amino acid sequence, which is deduced from one or more repeat modules. Preferably, said repeat modules are from repeat domains having binding specificity for the same target. Such repeat sequence motifs comprise framework residue positions and target interaction residue positions. Said framework residue positions correspond to the positions of framework residues of the repeat modules. Likewise, said target interaction residue positions correspond to the positions of target interaction residues of the repeat modules. Repeat sequence motifs comprise non-randomized positions and randomized positions.

The term "repeat unit" refers to amino acid sequences comprising sequence motifs of one or more naturally occurring proteins, wherein said "repeat units" are found in multiple copies, and exhibit a defined folding topology common to all said motifs determining the fold of the protein. Examples of such repeat units include leucine-rich repeat units, ankyrin repeat units, armadillo repeat units, tetratricopeptide repeat units, HEAT repeat units, and leucine-rich variant repeat units.

The term "has binding specificity for a target", "specifically binding to a target", "binding to a target with high specificity", "specific for a target" or "target specificity" and the like means that a binding protein or binding domain binds in PBS to a target with a lower dissociation constant (i.e. it binds with higher affinity) than it binds to an unrelated protein such as the E. coli maltose binding protein (MBP). Preferably, the dissociation constant ("Kd") in PBS for the target is at least $10^2$; more preferably, at least $10^3$; more preferably, at least $10^4$; or more preferably, at least $10^5$ times lower than the corresponding dissociation constant for MBP. Methods to determine dissociation constants of protein-protein interactions, such as surface plasmon resonance (SPR) based technologies (e.g. SPR equilibrium analysis) or isothermal titration calorimetry (ITC) are well known to the person skilled in the art. The measured Kd values of a particular protein-protein interaction can vary if measured under different conditions (e.g., salt concentration, pH). Thus, measurements of Kd values are preferably made with standardized solutions of protein and a standardized buffer, such as PBS. A typical and preferred determination of dissociation constants (Kd) of the inventive recombinant binding proteins with binding specificity for serum albumin by Surface Plasmon Resonance (SPR) analysis is described in Example 7.

The term "about" means the mentioned value +/−20%; for example "about 50" shall mean 40 to 60.

The term "PBS" means a phosphate buffered water solution containing 137 mM NaCl, 10 mM phosphate and 2.7 mM KCl and having a pH of 7.4. This is exemplified in Example 3. The term "phosphate/citrate buffer pH 6" means a watered buffer containing 375 mM Na2HPO4*2H2O, and 150 mM NaCl, and having a pH of 5.7. This is exemplified in Example 3. The term "phosphate/citrate buffer pH 5" means a watered buffer containing 30 mM Citric acid and 30 mM NaH2PO4, and having a pH of 4.75. This is exemplified in Example 3. The term "phosphate/citrate/borate buffer" means a watered buffer containing 30 mM citric acid, 30 mM NaH2PO4, 30 mM boric acid, and having a pH of 8.5. This is exemplified in Example 3.

The term "mouse serum albumin" refers to UniProt accession number P07724, the term "cynomolgus monkey serum albumin" (i.e. *Macaca fascicularis*) refers to UniProt accession number A2V9Z4, and the term "human serum albumin" refers to UniProt accession number P02768.

EXAMPLES

Proteins used in the examples:
Protein #2 (SEQ ID NO: 2 with a His-tag (SEQ ID NO: 1) fused to its N-terminus);
Protein #3 (SEQ ID NO: 3 with a His-tag (SEQ ID NO: 1) fused to its N-terminus);
Protein #4 (SEQ ID NO: 4 with a His-tag (SEQ ID NO: 1) fused to its N-terminus);
Protein #5 (SEQ ID NO: 5 with a His-tag (SEQ ID NO: 1) fused to its N-terminus);
Protein #6 (SEQ ID NO: 6 with a His-tag (SEQ ID NO: 1) fused to its N-terminus);
Protein #7 (SEQ ID NO: 7 with a His-tag (SEQ ID NO: 1) fused to its N-terminus);
Protein #8 (SEQ ID NO: 8 with a His-tag (SEQ ID NO: 1) fused to its N-terminus);
Protein #9 (SEQ ID NO: 9 with a His-tag (SEQ ID NO: 1) fused to its N-terminus);
Protein #10 (SEQ ID NO: 10 with a His-tag (SEQ ID NO: 1) fused to its N-terminus);
Protein #11 (SEQ ID NO: 11 with a His-tag (SEQ ID NO: 1) fused to its N-terminus);
Protein #12 (SEQ ID NO: 12 with a His-tag (SEQ ID NO: 1) fused to its N-terminus).

If not described otherwise, experiments were performed according to methods well-known to the person skilled in the art. The experimental conditions for some examples are further also described in WO2012/069654 and WO2016/156596.

Example 1: Construction of Designed Ankyrin Repeat Domains with Binding Specificity for Serum Albumin and with Improved Stability Unexpectedly, we observed that a protein consisting of an amino acid sequence corresponding to SEQ ID NO: 2 (originally described in WO2016156596) appears not to be stable upon incubation at elevated temperature (see Examples 2 to 6), despite the fact that it is a variant that has improved stability compared to earlier designed ankyrin repeat domains with binding specificity for serum albumin (WO2012/069654). The goal of the present invention is thus to provide variants of SEQ ID NO: 2 that exhibit improved stability upon incubation at elevated temperature, while preserving the serum albumin binding and pharmacokinetic properties. Through a highly iterative process involving several rounds of changing amino acids at a multitude of positions (e.g. comparable to the alanine scanning process well-known to the person skilled in the art) and characterizing the resulting protein variants in vitro and in vivo, finally 4 variants resulted that exhibit improved stability properties. Against expectations, these variants all involve the amino acid Asp at position 77 and/or 78, an amino acid which is known to be at the origin of polypeptide chain degradation. Very surprisingly, many of these variants include an Asp-Gly sequence motif, which is known to be particularly prone to polypeptide chain degradation. The process thus surprisingly led to unexpected variants.

The DNA encoding each of the designed ankyrin repeat domain consisting of SEQ ID NO: 2 to 6 was cloned into a pQE (QIAgen, Germany) based expression vector providing an N-terminal His-tag to facilitate simple protein purification as described below. The production and characterization as well as the use of these particularly selected sequences is described in the following examples.

Example 2: Expression and Purification of Proteins

Proteins Consisting of SEQ ID NOs: 2 to 6, Additionally Having a His-Tag SEQ ID NO: 1 fused to their N termini, as well as proteins consisting of SEQ ID NOs: 7 to 12, additionally having a His-tag SEQ ID NO: 1 fused to their N termini, were produced in *E. coli*, purified to homogeneity, and stored in PBS buffer. For clarity, proteins #2 to #6 are designed ankyrin repeat domains with binding specificity for serum albumin, proteins #7 to #12 are recombinant binding proteins comprising designed ankyrin repeat domains with binding specificity for serum albumin. Proteins #7 and #8 comprise twice SEQ ID NO: 2. Proteins #9 and #10 comprise twice SEQ ID NO: 3. Proteins #11 and #12 comprise twice SEQ ID NO: 4. Protein #7 is well known to the practitioner in the art from SEQ ID NO: 134 of WO2016156596, and protein #8 is well-known to the practitioner in the art from SEQ ID NO: 21 of WO2018054971. Hence, in comparison to protein #7, which is a recombinant binding protein comprising designed ankyrin repeat domains with binding specificity for serum albumin, proteins #9 and #11 are recombinant binding proteins comprising designed ankyrin repeat domains with (i) binding specificity for serum albumin and with (ii) improved storage stability. Likewise, in comparison to protein #8, which is a recombinant binding protein comprising designed ankyrin repeat domains with binding specificity for serum albumin, proteins #10 and #12 are recombinant binding proteins comprising designed ankyrin repeat domains with (i) binding specificity for serum albumin and with (ii) improved storage stability. Proteins expressed and purified as described in this paragraph were used for the experiments of Examples 3 to 12.

Alternatively, proteins consisting of SEQ ID NOs: 2 to 12, additionally having the amino acids GS at the N terminus, are produced in *E. coli*, purified to homogeneity, and stored in PBS buffer. In case the amino acids GS are at the N terminus, the Met residue additionally encoded by the expression vector is efficiently cleaved off in the cytoplasm of *E. coli* from the expressed polypeptide since the start Met is followed by a small Gly residue. The proteins consisting of SEQ ID NOs: 2 to 12, additionally having the amino acids GS at the N terminus, exhibit equivalent results in Examples 3 to 12 as the proteins consisting of SEQ ID NOs: 2 to 12, additionally having a His-tag SEQ ID NO: 1 fused to their N termini.

Example 3: Storage Stability Incubation

Proteins of Example 2 were tested for storage stability at various pH at 100 micromolar protein concentration at 60° C. for 1 week (7 days). Buffers used were PBS (pH 7.4; 137 mM NaCl, 10 mM phosphate and 2.7 mM KCl), or Phosphate/Citrate (pH 5.7; 375 mM Na2HPO4*2H2O and 150 mM NaCl, pH adjusted using 1 M citric acide monohydrate), or Phosphate/Citrate (pH 4.75; 30 mM Citric acid and 30 mM NaH2P04, pH adjusted using sodium hydroxide), or Phosphate/Citrate/Borate (pH 8.5, 30 mM citric acid, 30 mM NaH2P04, 30 mM boric acid). Upon mixing with the protein with the respective buffers, resulting pH values were pH 7.4, pH 6, pH 5, or pH 8.5, respectively. In parallel to the incubations at 60° C., aliquots of the proteins were incubated at −80° C. for 1 week (7 days) as controls.

The stability during incubation at 60° C. at different pH is industrially relevant for the manufacturing of designed ankyrin repeat domains or recombinant binding proteins, as the manufacturing process may comprise one or more process steps during which the polypeptides are exposed to such conditions. Also, persons skilled in the art determine storage stability by accelerated storage stability measurements, which is comprises the step of incubation at elevated temperature.

Example 4: SDS-PAGE of Storage Stability Analysis Samples

Samples of proteins of Example 3 (10 microgram protein each lane) were analyzed on NuPAGE 4-12% Bis-Tris sodium dodecyl polyacrylamide gel electrophoresis (SDS-PAGE) gels (Thermo Fisher), stained with instant blue staining (Sigma Aldrich). Results are shown in FIG. 3. All proteins show a main band at the expected size of about 14.4 kDa. Some proteins show additional bands at lower molecular weight (lower molecular weight products) and/or bands at higher molecular weight (higher molecular weight products). Proteins #3 and #4 exhibit lower amounts of lower molecular weight products at pH 7.4, pH. 6, and pH 5 compared to protein #2. Judging from SDS-PAGE, the reduction of lower molecular weight products is at least 10% at pH 7.4, pH 6, and/or pH 5. Similarly, judging from SDS-PAGE, the reduction of the amount of lower molecular weight products is at least 50% at pH 7.4, pH 6, and/or pH 5. Similarly, protein #2 shows at least 50% more lower molecular weight products or lower molecular weight product bands at pH 7.4, pH 6, and/or pH 5. Surprisingly, protein #2 exhibits higher molecular weight bands upon incubation at 60° C. for one week. Proteins #3 and #4 appear to not exhibit higher molecular weight bands, i.e. exhibit improved stability. Judging from SDS-PAGE, the reduction of higher molecular weight band product bands when comparing protein #2 with proteins #3 and #4 is at least 50% at pH 7.4, at least 50% at pH 6, and at least 50% at pH 5. Similarly, protein #2 shows an increase of higher molecular weight bands and/or higher molecular weight products amounting to at least 10% at pH 7.4, at least 20% at pH 6, and at least 50% at pH 5.

Example 5: LabChip Analysis of Storage Stability Analysis Samples

Samples of proteins of Example 3 were analyzed using a LabChip GXII instrument according to the manufacturer (Perkin Elmer). Briefly, samples were mixed with denaturing solution and denatured for 10 minutes at 70° C., followed by analysis on a HT Protein Express Chip. Runs were analyzed using the instrument's software. Results are shown in FIG. 4. Proteins #3 and #4 exhibit lower amounts of degradation products or lower molecular weight products at pH 7.4, pH. 6, and pH 5 compared to protein #2. Judging from the LabChip data, the reduction of degradation product bands or lower molecular weight product bands is at least 10% at pH 7.4, pH 6, and pH 5. Protein #2 exhibits higher molecular weight bands upon incubation at 60° C. for one week, whereas proteins #3 and #4 do not exhibit higher molecular weight bands. Judging from the LabChip data, the reduction of higher molecular weight band product bands is at least 10% at pH 7.4, and at least 50% at pH 6 (see Table 1). In this example for proteins #2-#4, a band is considered a higher molecular weight band in LabChip analyses in case it is larger than 25 kDa. In this example for proteins #2-#4, a band is considered a lower molecular weight band in LabChip analyses in case it is smaller than 10 kDa. Assuming high purity of the protein preparation, such lower molecular weight bands can be considered degradation product bands.

TABLE 1

Percent higher-molecular-weight bands at different pH detected by LabChip

| Protein #* | Percent HMW bands | | |
|---|---|---|---|
| | pH 6 | pH 7.4 | pH 8.5 |
| 2 | 4.7 | 0.4 | 0 |
| 3 | 0 | 0 | 0 |
| 4 | 0 | 0 | 0 |

*Proteins #2, #3, and #4 in this table represent designed ankyrin repeat domains consisting of the corresponding amino acid sequence of SEQ ID NO: 2 to 4, and additionally an N-terminal His-tag (SEQ ID NO: 1).

Example 6: Size-Exclusion Chromatography Analysis of Storage Stability Analysis Samples Samples of Example 3 were analyzed on a GE Superdex 200 150/5 column on a Agilent 1200 HPLC system in PBS at 0.5 ml/min flow rate. Of each protein, 0.1 ml à 100 micromolar each of the −80° C. control sample and the 60° C. incubation sample were analyzed. The size exclusion chromatograms (optical density at 280 nm subtracted by the optical density at 360 nm) are shown in FIG. 5a (pH 7.4), FIG. 5b (pH 6), and FIG. 5c (pH 5). Proteins #3 and #4 show approximately overlapping chromatograms of the −80° C. control sample and the 60° C. incubation sample at pH 7.4, pH 6, and pH 5. Protein #2 shows approximately overlapping chromatograms of the −80° C. control sample and the 60° C. incubation sample at pH 7.4, and pH 6. In contrast, protein #2 showed a clear increase in higher apparent molecular weight species in the 60° C. incubation sample compared to the −80° C. control sample at pH 5. The higher apparent molecular weight species of protein #2 at pH 5 in the 60° C. incubation sample corresponds to 25% of the total area under the curve, whereas the protein #2-80° C. control sample at pH 5 shows no higher apparent molecular weight species. The higher apparent molecular weight species in this example is the species eluting with a peak at around 4.1 minutes. The expected apparent molecular weight species is the species eluting with a peak at around 4.6 minutes. Protein #3 and #4 show no higher apparent molecular weight species in the 60° C. incubation sample at pH 5.

Example 7: Affinity Measurement

Affinity of proteins of Example 2 to human serum albumin were determined by SPR measurements using a ProteOn system (BioRad) in PBS according to standard procedures known to the person skilled in the art. Affinities determined are listed in Table 2. All designed ankyrin repeat domains with binding specificity for serum albumin exhibit dissociation constants $K_D$<100 nM and the dissociation constants are in a comparable range.

TABLE 2

Dissociation constants (Kd) of designed ankyrin repeat domains binding to human serum albumin

| Protein #* | Kd [nM] human |
| --- | --- |
| 2 | 31.1 |
| 3 | 35.5 |
| 4 | 34.4 |

*Proteins #2, #3, and #4 in this table represent designed ankyrin repeat domains consisting of the corresponding amino acid sequence of SEQ ID NO: 2 to 4, and additionally an N-terminal His-tag (SEQ ID NO: 1).

Example 8: Serum Albumin Species Cross-Reactivity

Samples of proteins of Example 2 were subjected to ELISA serum albumin cross-reactivity analyses as described in WO2016156596. 100 µl of 20 nM serum albumin in PBS per well were immobilized in a Maxisorp plate (Nunc, Denmark) overnight at 4° C. After washing 5 times with 300 µl PBST (PBS supplemented with 0.1% Tween 20), the wells were blocked with 300 µl PBST-C (PBST supplemented with 0.25% casein) for 2 h at room temperature with shaking at 450 rpm on a Titramax 1000 shaker (Heidolph, Germany). After washing 5 times as described above, 100 µl/well or 50 µl/well proteins #2, #3, or #4 (concentrations ranging from 100 nM to 0.01 pM for each protein) in PBST-C were applied and incubated for 2 h at room temperature with shaking at 450 rpm. After washing 5 times as described above, binding of the proteins was detected using 100 µl rabbit anti-designed ankyrin repeat domain monoclonal antibody in PBST-C for 1 h at room temperature with shaking at 450 rpm. After washing 5 times as described above, bound anti-designed ankyrin repeat domain antibody was detected using 100 µl/well goat anti-rabbit IgG-HRP conjugate in PBST-C for 1 h at room temperature with shaking at 450 rpm. After washing 5 times as described above, the ELISA was then developed using 100 µl BM soluble blue POD substrate (Roche, Switzerland), diluted 1:4 in water. The reaction was stopped after 5 min using 100 µl 1 M H2SO4. The OD (OD 450 nm-OD 620 nm) was then recorded. EC 50 values were determined using Graph Pad Prism (Table 3). The analyses show that serum albumin of human, cynomolgus monkey, and mouse are bound with high affinity. The measured EC 50 values for human serum albumin binding are below 1 nM for proteins #2, #3, and #4. The measured $EC_{50}$ values for cynomolgus monkey serum albumin binding are below 20 nM for proteins #2, #3, and #4. The measured EC 50 values for mouse serum albumin binding are below 30 nM for proteins #2, #3, and #4.

TABLE 3

$EC_{50}$ [nM] of designed ankyrin repeat domains binding to serum albumin

| Protein #* | human | cynomolgus monkey | mouse |
| --- | --- | --- | --- |
| 2 | 0.32 | 2.8 | 9.6 |
| 3 | 0.64 | 6.8 | 14.7 |
| 4 | 0.84 | 13.1 | 24.0 |

*Proteins #2, #3, and #4 in this table represent designed ankyrin repeat domains consisting of the corresponding amino acid sequence of SEQ ID NO: 2 to 4, and additionally an N-terminal His-tag (SEQ ID NO: 1).

Figure 6A:
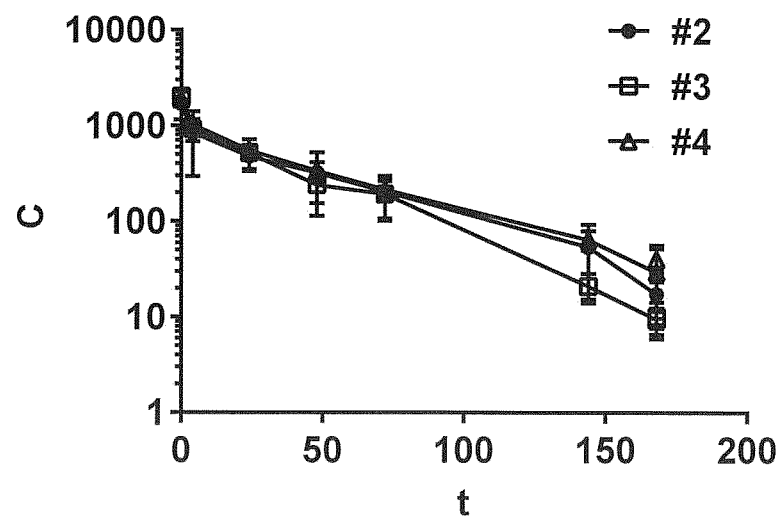
FIG. 6. Pharmacokinetic profiles in mouse (a) and cynomolgus monkey (b) of designed ankyrin repeat domains with binding specificity for serum albumin given intravenously at 1 mg/kg. Proteins #2, #3, and #4 (consisting of SEQ ID NOs: 2 to 4, respectively; all additionally having SEQ ID NO: 1 at the N terminus; symbol indicated in the figure) were produced as described in Example 2, and mouse pharmacokinetic profiles were determined as described in Example 9 and cynomolgus monkey pharmacokinetic profiles were determined as described in Example 10. The average protein concentrations from three mice or two monkeys are shown including the respective standard deviations. C: concentration in [nM]; t: time in [hours].

Example 9: Pharmacokinetic Profiles in Mouse of Designed Ankyrin Repeat Domains with Binding Specificity for Serum Albumin Pharmacokinetic analyses were performed in female Balb/c mice using Proteins #2, #3, and #4, produced as described in Example 2. Proteins were applied at 1 mg/kg by intravenous injection into the tail vein. Six mice, divided in two groups of 3 mice each, were used for each protein. For every protein, blood was collected from the mice of one group 5 min, 24 h, 72 h, 168 h, and 360 h post injection, and from the mice of the other group 4 h, 48 h, 144 h, and 168 h post injection. The blood samples were allowed to stand at room temperature and were centrifuged to generate serum using procedures well-known to the person skilled in the art, followed by storage at −80° C. pending analyses. Serum concentrations of proteins #2, #3, and #4 were determined by sandwich ELISA using a rabbit monoclonal anti-DARPin antibody as capture reagent and an anti-RGS-His antibody-HRP conjugate as detection reagent, and using a standard curve. The monoclonal anti-DARPin antibody was generated using conventional rabbit immunization and hybridoma generation techniques well known to the person skilled in the art, and the binding of the monoclonal antibody to proteins #2 to #16 was verified prior to concentration determination experiments. Briefly, 100 µl 10 nM of goat-anti-rabbit antibody (Thermo Scientific) in PBS per well were immobilized in a Maxisorp plate (Nunc, Denmark) overnight at 4° C. After washing 5 times with 300 µl PBST (PBS supplemented with 0.1% Tween 20), the wells were blocked with 300 µl PBST-C (PBST supplemented with 0.25% casein) for 1 h at room temperature with shaking at 450 rpm on a Titramax 1000 shaker (Heidolph, Germany). After washing 5 times as described above, 100 µl/well 5 nM rabbit-anti-DARPin antibody in PBST-C were added for 1 h at room temperature with shaking at 450 rpm. After washing 5 times as described above, different dilutions of serum samples or standard references, diluted in PBST-C, were added for 2 hours at room temperature with shaking at 450 rpm. After washing 5 times as described above, 50 µl 100 ng/ml mouse anti-RGS-His antibody-HRP conjugate (QIAgen) in PBST-C was added for 30 min at room temperature with shaking at 450 rpm. After washing 5 times as described above, the ELISA was developed using 50 μl TMB substrate. The reaction was stopped after 5 min using 100 μl 1 M H2504. The OD (OD 450 nm-OD 620 nm) was then recorded. Pharmacokinetic parameters were determined using standard software such as Phoenix WinNonLin (Certara, Princeton, USA) or GraphPadPrism (GraphPad Software, La Jolla, USA) and standard analyses such as non-compartmental analyses, all well-known to the person skilled in the art. The resulting pharmacokinetic profiles are shown in FIG. 6a. The pharmacokinetic parameters area under the curve, clearance, volume of distribution, and half-life, derived from the measurements are listed in Table 4.

TABLE 4

Pharmacokinetic parameters in mouse of proteins #2, #3, and #4

| Parameter | Unit | #2* | #3* | #4* |
|---|---|---|---|---|
| AUCINF_D_pred | h*(nmol/L) | 60551 | 58225 | 45108 |
| Cl_pred | L/(h*kg) | 0.0011 | 0.0012 | 0.0015 |
| Vss_pred | L/kg | 0.061 | 0.064 | 0.078 |
| HL_Lambda_z | H | 40.9 | 41.6 | 39.7 |

*Proteins #2, #3, and #4 in this table represent designed ankyrin repeat domains consisting of the corresponding amino acid sequence of SEQ ID NO: 2 to 4, and additionally an N-terminal His-tag (SEQ ID NO: 1).

Figure 6B:
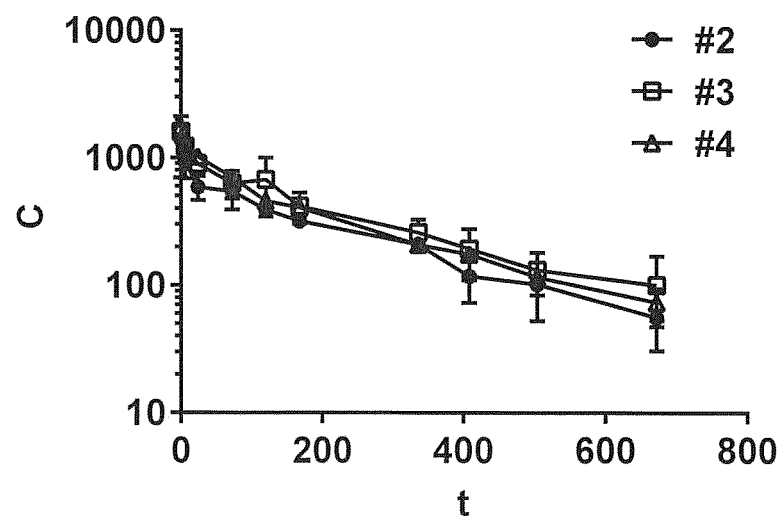

Example 10: Pharmacokinetic Profiles in Cynomolgus Monkey of Designed Ankyrin Repeat Domains with Binding Specificity for Serum Albumin Pharmacokinetic analyses were performed in two male *Macaca fascicularis* for each protein at 1 mg/kg dosed via 30 min intravenous infusion administration. For every protein, blood was collected from every animal 5 min, 6 h, 24 h, 72 h, 120 h, 168 h, 336 h, 408 h, 504 h, and 672 h post injection. The blood samples were allowed to stand at room temperature and were centrifuged to generate serum using procedures well-known to the person skilled in the art, followed by storage at −80° C. pending analyses. Serum concentrations of proteins #2, #3, and #4 were determined by sandwich ELISA as described in Example 9. Pharmacokinetic parameters were determined using standard software such as Phoenix WinNonLin (Certara, Princeton, USA) or GraphPadPrism (GraphPad Software, La Jolla, USA) and standard analyses such as non-compartmental analyses, all well-known to the person skilled in the art. The resulting pharmacokinetic profiles are shown in FIG. 6b. The pharmacokinetic parameters area under the curve, clearance, volume of distribution, and half-life, derived from the measurements are listed in Table 5.

Example 11: Generation and Characterization of Recombinant Binding Proteins Using Designed Ankyrin Repeat Domains with Binding Specificity for Serum Albumin and with Improved Stability Recombinant binding proteins, comprising designed ankyrin repeat domains with binding specificity for serum albumin and with improved storage stability, were generated by recombinant DNA technology. SEQ ID NOs: 7 to 12 are examples of such recombinant binding proteins. Proteins #7, #8, #9, #10, #11, and #12 (consisting of SEQ ID NOs: 7 to 12, additionally having a His-tag SEQ ID NO: 1 fused to their N termini; see Example 2) were produced as described in Example 3. Similarly, proteins consisting of SEQ ID NOs: 7 to 12, each additionally carrying the amino acids MGS at the N terminus (wherein the N-terminal methionine is efficiently cleaved off in the cytoplasm of *E. coli* from the expressed polypeptide since the start Met is followed by a small Gly residue), can be produced in *E. coli* and be purified using conventional methods.

Recombinant binding proteins are assessed for stability improvement according to examples 3 to 6. The recombinant binding proteins consisting of SEQ ID NOs: 9 and 11 exhibit higher stability than the recombinant binding protein consisting of SEQ ID NO: 7. Likewise, the recombinant binding proteins consisting of SEQ ID NOs: 10 and 12 exhibit higher stability than the recombinant binding protein consisting of SEQ ID NO: 8.

Example 12: Pharmacokinetic Profiles in Mouse of Recombinant Binding Proteins Comprising Designed Ankyrin Repeat Domains with Binding Specificity for Serum Albumin Pharmacokinetic analyses were performed in mice using Proteins #7, #9, and #11, and using proteins #8, #10, and #12, all produced as described in Example 2. The study was essentially performed as described in Example 9, using three mice per protein and taking blood 5 min, 4 h, 48 h and 96

TABLE 5

Pharmacokinetic parameters in cynomolgus monkey of proteins #2-#4

| Parameter | Unit | #2* | #3* | #4* |
|---|---|---|---|---|
| AUCINF_D_pred | h*(nmol/L) | 183329 | 255149 | 233149 |
| Cl_pred | L/(h*kg) | 0.00038 | 0.00029 | 0.00030 |
| Vss_pred | L/kg | 0.097 | 0.075 | 0.070 |
| HL_Lambda_z | H | 191.4 | 194.9 | 177.3 |

Figure 7A:
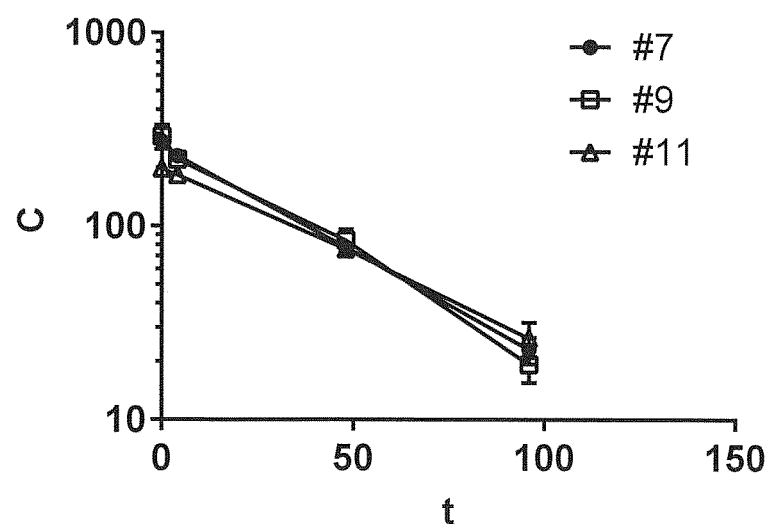
FIG. 7. Pharmacokinetic profiles in mouse of recombinant binding proteins comprising designed ankyrin repeat domains with binding specificity for serum albumin given intravenously at 1 mg/kg. Proteins #7, #8, #9, #10, #11, and #12 (consisting of SEQ ID NOs: 7 to 12, respectively; all additionally having SEQ ID NO: 1 at the N terminus; symbols indicated in the figure) were produced as described in Example 2, and mouse pharmacokinetic profiles were determined as described in Example 11. The average protein concentrations from three mice are shown including standard deviation. To facilitate comparison, proteins #7, #9, and #11 (a), as well as proteins #8, #10, and #12 (b) are displayed in two separate graphs. C: concentration in [nM]; t: time in [hours].
Figure 7B:
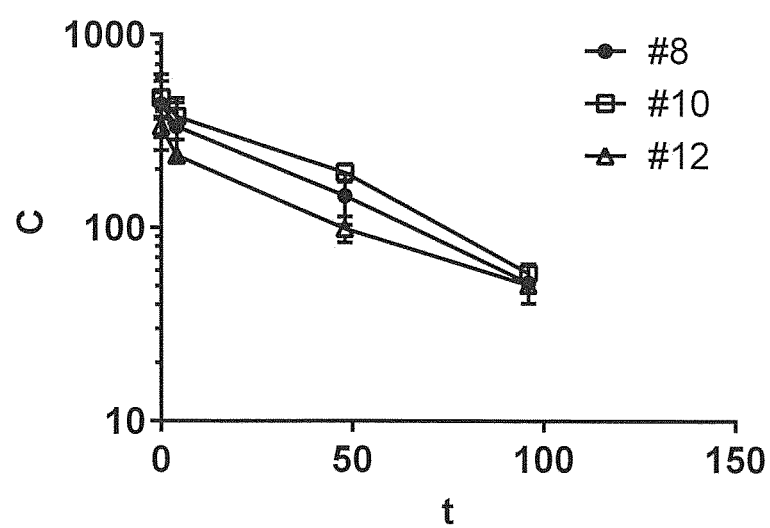

*Proteins #2, #3, and #4 in this table represent designed ankyrin repeat domains consisting of the corresponding amino acid sequence of SEQ ID NO: 2 to 4, and additionally an N-terminal His-tag (SEQ ID NO: 1).

h post injection. Concentration determination and determination of pharmacokinetic parameters was performed as described in Example 9. For a comparison of proteins #7, #9, and #11, pharmacokinetic traces are shown in FIG. 7a and the pharmacokinetic parameters area under the curve, clearance, volume of distribution, and half-life, derived from the measurements for all proteins are listed in Table 6. For a comparison of proteins #8, #10, and #12, pharmacokinetic traces are shown in FIG. 7b and the pharmacokinetic parameters area under the curve, clearance, volume of distribution, and half-life, derived from the measurements for all proteins are listed in Table 7.

TABLE 6

Pharmacokinetic parameters in mouse of proteins #7, #9, and #11

| Parameter | Unit | #7* | #9* | #11* |
|---|---|---|---|---|
| AUCINF_D_pred | h*(nmol/L) | 11125 | 10994 | 10216 |
| Cl_pred | L/(h*kg) | 0.0014 | 0.0014 | 0.0015 |
| Vss_pred | L/kg | 0.047 | 0.046 | 0.056 |
| HL_Lambda_z | h | 27.7 | 26 | 33 |

*Proteins #7, #9, and #11 in this table represent designed ankyrin repeat domains consisting of the corresponding amino acid sequence of SEQ ID NO: 7, 9, and 11, and additionally an N-terminal His-tag (SEQ ID NO: 1).

TABLE 7

Pharmacokinetic parameters in mouse of proteins #8, #10, and #12

| Parameter | Unit | #8* | #10* | #12* |
|---|---|---|---|---|
| AUCINF_D_pred | h*(nmol/L) | 19541 | 23357 | 15030 |
| Cl_pred | L/(h*kg) | 0.00085 | 0.00071 | 0.0011 |
| Vss_pred | L/kg | 0.037 | 0.032 | 0.060 |
| HL_Lambda_z | h | 34.3 | 34.1 | 41.4 |

*Proteins #8, #10, and #12 in this table represent designed ankyrin repeat domains consisting of the corresponding amino acid sequence of SEQ ID NO: 8, 10, and 12, and additionally an N-terminal His-tag (SEQ ID NO: 1).

The invention claimed is:

1. A designed ankyrin repeat domain with binding specificity for serum albumin, wherein said designed ankyrin repeat domain comprises an amino acid sequence that has at least 80% sequence identity with the amino acid sequence of SEQ ID NO: 3 or 4, and wherein said designed ankyrin repeat domain (i) has an aspartic acid (D) at the position corresponding to position 77 of SEQ ID NO: 3 and has an alanine (A) at the position corresponding to position 78 of SEQ ID NO: 3; or (ii) has an alanine (A) at the position corresponding to position 77 of SEQ ID NO: 4 and has an aspartic acid (D) at the position corresponding to position 78 of SEQ ID NO: 4.

2. The designed ankyrin repeat domain of claim 1, wherein said designed ankyrin repeat domain comprises the amino acid sequence

KDFAGKTPLHLAAX$_1$X$_2$G (SEQ ID NO: 13)

wherein:
X$_1$ represents an amino acid residue selected from the group consisting of A and D; and X$_2$ represents an amino acid residue selected from the group consisting of A and D.

3. The designed ankyrin repeat domain of claim 1, wherein said designed ankyrin repeat domain comprises an amino acid sequence selected from the group consisting of SEQ ID NOs: 3 and 4.

4. The designed ankyrin repeat domain of claim 1, wherein said designed ankyrin repeat domain comprises SEQ ID NO: 3 or SEQ ID NO: 4.

5. The designed ankyrin repeat domain of claim 1, wherein said designed ankyrin repeat domain binds human serum albumin in PBS with a dissociation constant (K$_D$) of or below 100 nM.

6. The designed ankyrin repeat domain of claim 1, wherein said designed ankyrin repeat domain has an improved stability compared to the designed ankyrin repeat domain consisting of SEQ ID NO: 2.

7. The designed ankyrin repeat domain of claim 1, wherein said designed ankyrin repeat domain exhibits less degradation bands on SDS-PAGE compared to the designed ankyrin repeat domain consisting of SEQ ID NO: 2, wherein said SDS-PAGE is performed following one week incubation at 100 micromolar at 60° C. at pH 5.0.

8. The designed ankyrin repeat domain of claim 1, wherein said designed ankyrin repeat domain (i) exhibits less higher molecular weight bands on SDS-PAGE compared to the designed ankyrin repeat domain consisting of SEQ ID NO: 2, wherein said SDS-PAGE is performed following one week incubation at 100 micromolar at 60° C. at pH 5.0, and/or (ii) exhibits less higher molecular weight peak in size-exclusion chromatography compared to the designed ankyrin repeat domain consisting of SEQ ID NO: 2, wherein said size-exclusion chromatography is performed following one week incubation at 100 micromolar at 60° C. at pH 5.0.

9. The designed ankyrin repeat domain of claim 1, wherein said designed ankyrin repeat domain exhibits at least 10% less higher molecular weight bands in LabChip analysis compared to the designed ankyrin repeat domain consisting of SEQ ID NO: 2, wherein said LabChip analysis is performed following incubation at 100 micromolar at 60° C. at pH 6.0 or 7.4.

10. A recombinant binding protein comprising one or two designed ankyrin repeat domains of claim 1.

11. The recombinant binding protein of claim 10, wherein said recombinant binding protein has an improved stability compared to a recombinant binding protein with identical amino acid sequence except that each of said designed ankyrin repeat domains with binding specificity for serum albumin is substituted with a designed ankyrin repeat domain consisting of SEQ ID NO: 2.

12. A nucleic acid encoding the designed ankyrin repeat domain or the recombinant binding protein of claim 1.

13. A pharmaceutical composition comprising the designed ankyrin repeat domain or the recombinant binding protein of claim 1, and a pharmaceutically acceptable carrier and/or diluent.

14. The designed ankyrin repeat domain of claim 1, wherein said designed ankyrin repeat domain further comprises at its N-terminus, a G, an S, or a GS.

15. The designed ankyrin repeat domain of claim 1, wherein A at the second to last position is substituted with L and/or A at the last position is substituted with N.

16. A pharmaceutical composition comprising the recombinant binding protein of claim 10 and a pharmaceutically acceptable carrier and/or diluent.

17. A pharmaceutical composition comprising the nucleic acid of claim 12 and a pharmaceutically acceptable carrier and/or diluent.

* * * * *

SEQUENCE LISTING

<160> NUMBER OF SEQ ID NOS: 15

<210> SEQ ID NO 1
<211> LENGTH: 12
<212> TYPE: PRT
<213> ORGANISM: Artificial Sequence
<220> FEATURE:
<223> OTHER INFORMATION: His-tag

<400> SEQUENCE: 1

Met Arg Gly Ser His His His His His His Gly Ser
1               5                   10

<210> SEQ ID NO 2
<211> LENGTH: 124
<212> TYPE: PRT
<213> ORGANISM: Artificial Sequence
<220> FEATURE:
<223> OTHER INFORMATION: ankyrin repeat domain

<400> SEQUENCE: 2

Asp Leu Gly Lys Lys Leu Leu Glu Ala Ala Arg Ala Gly Gln Asp Asp
1               5                   10                  15

Glu Val Arg Glu Leu Leu Lys Ala Gly Ala Asp Val Asn Ala Lys Asp
                20                  25                  30

Tyr Phe Ser His Thr Pro Leu His Leu Ala Ala Arg Asn Gly His Leu
            35                  40                  45

Lys Ile Val Glu Val Leu Leu Lys Ala Gly Ala Asp Val Asn Ala Lys
        50                  55                  60

Asp Phe Ala Gly Lys Thr Pro Leu His Leu Ala Ala Asn Glu Gly His

```
            65                  70                  75                  80
Leu Glu Ile Val Glu Val Leu Lys Ala Gly Ala Asp Val Asn Ala
                    85                  90                  95

Gln Asp Ile Phe Gly Lys Thr Pro Ala Asp Ile Ala Ala Asp Ala Gly
                100                 105                 110

His Glu Asp Ile Ala Glu Val Leu Gln Lys Ala Ala
                115                 120

<210> SEQ ID NO 3
<211> LENGTH: 124
<212> TYPE: PRT
<213> ORGANISM: Artificial Sequence
<220> FEATURE:
<223> OTHER INFORMATION: ankyrin repeat domain

<400> SEQUENCE: 3

Asp Leu Gly Lys Lys Leu Leu Glu Ala Ala Arg Ala Gly Gln Asp Asp
1               5                   10                  15

Glu Val Arg Glu Leu Leu Lys Ala Gly Ala Asp Val Asn Ala Lys Asp
                20                  25                  30

Tyr Phe Ser His Thr Pro Leu His Leu Ala Ala Arg Asn Gly His Leu
            35                  40                  45

Lys Ile Val Glu Val Leu Leu Lys Ala Gly Ala Asp Val Asn Ala Lys
        50                  55                  60

Asp Phe Ala Gly Lys Thr Pro Leu His Leu Ala Ala Asp Ala Gly His
65                  70                  75                  80

Leu Glu Ile Val Glu Val Leu Leu Lys Ala Gly Ala Asp Val Asn Ala
                    85                  90                  95

Gln Asp Ile Phe Gly Lys Thr Pro Ala Asp Ile Ala Ala Asp Ala Gly
                100                 105                 110

His Glu Asp Ile Ala Glu Val Leu Gln Lys Ala Ala
                115                 120

<210> SEQ ID NO 4
<211> LENGTH: 124
<212> TYPE: PRT
<213> ORGANISM: Artificial Sequence
<220> FEATURE:
<223> OTHER INFORMATION: ankyrin repeat domain

<400> SEQUENCE: 4

Asp Leu Gly Lys Lys Leu Leu Glu Ala Ala Arg Ala Gly Gln Asp Asp
1               5                   10                  15

Glu Val Arg Glu Leu Leu Lys Ala Gly Ala Asp Val Asn Ala Lys Asp
                20                  25                  30

Tyr Phe Ser His Thr Pro Leu His Leu Ala Ala Arg Asn Gly His Leu
            35                  40                  45

Lys Ile Val Glu Val Leu Leu Lys Ala Gly Ala Asp Val Asn Ala Lys
        50                  55                  60

Asp Phe Ala Gly Lys Thr Pro Leu His Leu Ala Ala Asp Ala Gly His
65                  70                  75                  80

Leu Glu Ile Val Glu Val Leu Leu Lys Ala Gly Ala Asp Val Asn Ala
                    85                  90                  95

Gln Asp Ile Phe Gly Lys Thr Pro Ala Asp Ile Ala Ala Asp Ala Gly
                100                 105                 110

His Glu Asp Ile Ala Glu Val Leu Gln Lys Ala Ala
                115                 120
```

<210> SEQ ID NO 5
<211> LENGTH: 124
<212> TYPE: PRT
<213> ORGANISM: Artificial Sequence
<220> FEATURE:
<223> OTHER INFORMATION: ankyrin repeat domain

<400> SEQUENCE: 5

Asp Leu Gly Lys Lys Leu Leu Glu Ala Ala Arg Ala Gly Gln Asp Asp
1               5                   10                  15

Glu Val Arg Glu Leu Leu Lys Ala Gly Ala Asp Val Asn Ala Lys Asp
            20                  25                  30

Tyr Phe Ser His Thr Pro Leu His Leu Ala Ala Arg Asn Gly His Leu
        35                  40                  45

Lys Ile Val Glu Val Leu Leu Lys Ala Gly Ala Asp Val Asn Ala Lys
    50                  55                  60

Asp Phe Ala Gly Lys Thr Pro Leu His Leu Ala Ala Ile Asp Gly His
65                  70                  75                  80

Leu Glu Ile Val Glu Val Leu Leu Lys Ala Gly Ala Asp Val Asn Ala
                85                  90                  95

Gln Asp Ile Phe Gly Lys Thr Pro Ala Asp Ile Ala Ala Asp Ala Gly
            100                 105                 110

His Glu Asp Ile Ala Glu Val Leu Gln Lys Ala Ala
            115                 120

<210> SEQ ID NO 6
<211> LENGTH: 124
<212> TYPE: PRT
<213> ORGANISM: Artificial Sequence
<220> FEATURE:
<223> OTHER INFORMATION: ankyrin repeat domain

<400> SEQUENCE: 6

Asp Leu Gly Lys Lys Leu Leu Glu Ala Ala Arg Ala Gly Gln Asp Asp
1               5                   10                  15

Glu Val Arg Glu Leu Leu Lys Ala Gly Ala Asp Val Asn Ala Lys Asp
            20                  25                  30

Tyr Phe Ser His Thr Pro Leu His Leu Ala Ala Arg Asn Gly His Leu
        35                  40                  45

Lys Ile Val Glu Val Leu Leu Lys Ala Gly Ala Asp Val Asn Ala Lys
    50                  55                  60

Asp Phe Ala Gly Lys Thr Pro Leu His Leu Ala Ala Asp Asp Gly His
65                  70                  75                  80

Leu Glu Ile Val Glu Val Leu Leu Lys Ala Gly Ala Asp Val Asn Ala
                85                  90                  95

Gln Asp Ile Phe Gly Lys Thr Pro Ala Asp Ile Ala Ala Asp Ala Gly
            100                 105                 110

His Glu Asp Ile Ala Glu Val Leu Gln Lys Ala Ala
            115                 120

<210> SEQ ID NO 7
<211> LENGTH: 601
<212> TYPE: PRT
<213> ORGANISM: Artificial Sequence
<220> FEATURE:
<223> OTHER INFORMATION: Protein comprising four ankyrin repeat domains

<400> SEQUENCE: 7

Asp Leu Gly Lys Lys Leu Leu Glu Ala Ala Arg Ala Gly Gln Asp Asp

```
1               5                   10                  15
Glu Val Arg Glu Leu Leu Lys Ala Gly Ala Asp Val Asn Ala Lys Asp
                20                  25                  30
Tyr Phe Ser His Thr Pro Leu His Leu Ala Ala Arg Asn Gly His Leu
                35                  40                  45
Lys Ile Val Glu Val Leu Leu Lys Ala Gly Ala Asp Val Asn Ala Lys
50                  55                  60
Asp Phe Ala Gly Lys Thr Pro Leu His Leu Ala Ala Asn Glu Gly His
65                  70                  75                  80
Leu Glu Ile Val Glu Val Leu Leu Lys Ala Gly Ala Asp Val Asn Ala
                85                  90                  95
Gln Asp Ile Phe Gly Lys Thr Pro Ala Asp Ile Ala Ala Asp Ala Gly
                100                 105                 110
His Glu Asp Ile Ala Glu Val Leu Gln Lys Ala Ala Gly Ser Pro Thr
                115                 120                 125
Pro Thr Pro Thr Thr Pro Thr Pro Thr Pro Thr Thr Pro Thr Pro Thr
                130                 135                 140
Pro Thr Gly Ser Asp Leu Gly Lys Lys Leu Leu Glu Ala Ala Arg Ala
145                 150                 155                 160
Gly Gln Asp Asp Glu Val Arg Ile Leu Leu Lys Ala Gly Ala Asp Val
                165                 170                 175
Asn Ala Lys Asp Arg Tyr Gly Asp Thr Pro Leu His Leu Ala Ala Asp
                180                 185                 190
Ile Gly His Leu Glu Ile Val Glu Val Leu Leu Lys Ala Gly Ala Asp
                195                 200                 205
Val Asn Ala Glu Asp Tyr Phe Gly Asn Thr Pro Leu His Leu Ala Ala
                210                 215                 220
Ser Tyr Gly His Leu Glu Ile Val Glu Val Leu Leu Lys Ala Gly Ala
225                 230                 235                 240
Asp Val Asn Ala Lys Asp Asp Tyr Gly Asn Thr Pro Leu His Leu Ala
                245                 250                 255
Ala Asn Thr Gly His Leu Glu Ile Val Glu Val Leu Leu Lys Ala Gly
                260                 265                 270
Ala Asp Val Asn Ala Gln Asp Lys Ser Gly Lys Thr Pro Ala Asp Leu
                275                 280                 285
Ala Ala Asp Ala Gly His Glu Asp Ile Ala Glu Val Leu Gln Lys Ala
                290                 295                 300
Ala Gly Ser Pro Thr Pro Thr Pro Thr Thr Pro Thr Pro Thr Pro Thr
305                 310                 315                 320
Thr Pro Thr Pro Thr Pro Thr Gly Ser Asp Leu Asp Lys Lys Leu Leu
                325                 330                 335
Glu Ala Ala Arg Ala Gly Gln Asp Asp Glu Val Arg Ile Leu Leu Lys
                340                 345                 350
Ala Gly Ala Asp Val Asn Ala Lys Asp Ser Thr Gly Trp Thr Pro Leu
                355                 360                 365
His Leu Ala Ala Pro Trp Gly His Pro Glu Ile Val Glu Val Leu Leu
                370                 375                 380
Lys Ala Gly Ala Asp Val Asn Ala Lys Asp Phe Gln Gly Trp Thr Pro
385                 390                 395                 400
Leu His Leu Ala Ala Ala Ala Gly His Leu Glu Ile Val Glu Val Leu
                405                 410                 415
Leu Lys Ala Gly Ala Asp Val Asn Ala Gln Asp Lys Ser Gly Lys Thr
                420                 425                 430
```

```
Pro Ala Asp Leu Ala Ala Asp Ala Gly His Glu Asp Ile Ala Glu Val
            435                 440                 445

Leu Gln Lys Ala Ala Gly Ser Pro Thr Pro Thr Pro Thr Thr Pro Thr
        450                 455                 460

Pro Thr Pro Thr Thr Pro Thr Pro Thr Pro Thr Gly Ser Asp Leu Gly
465                 470                 475                 480

Lys Lys Leu Leu Glu Ala Ala Arg Ala Gly Gln Asp Asp Glu Val Arg
                485                 490                 495

Glu Leu Leu Lys Ala Gly Ala Asp Val Asn Ala Lys Asp Tyr Phe Ser
            500                 505                 510

His Thr Pro Leu His Leu Ala Ala Arg Asn Gly His Leu Lys Ile Val
        515                 520                 525

Glu Val Leu Leu Lys Ala Gly Ala Asp Val Asn Ala Lys Asp Phe Ala
    530                 535                 540

Gly Lys Thr Pro Leu His Leu Ala Ala Asn Glu Gly His Leu Glu Ile
545                 550                 555                 560

Val Glu Val Leu Leu Lys Ala Gly Ala Asp Val Asn Ala Gln Asp Ile
                565                 570                 575

Phe Gly Lys Thr Pro Ala Asp Ile Ala Ala Asp Ala Gly His Glu Asp
            580                 585                 590

Ile Ala Glu Val Leu Gln Lys Ala Ala
        595                 600

<210> SEQ ID NO 8
<211> LENGTH: 568
<212> TYPE: PRT
<213> ORGANISM: Artificial Sequence
<220> FEATURE:
<223> OTHER INFORMATION: Protein comprising four ankyrin repeat domains

<400> SEQUENCE: 8

Asp Leu Gly Lys Lys Leu Leu Glu Ala Ala Arg Ala Gly Gln Asp Asp
1               5                   10                  15

Glu Val Arg Glu Leu Leu Lys Ala Gly Ala Asp Val Asn Ala Lys Asp
            20                  25                  30

Tyr Phe Ser His Thr Pro Leu His Leu Ala Ala Arg Asn Gly His Leu
        35                  40                  45

Lys Ile Val Glu Val Leu Leu Lys Ala Gly Ala Asp Val Asn Ala Lys
    50                  55                  60

Asp Phe Ala Gly Lys Thr Pro Leu His Leu Ala Ala Asn Glu Gly His
65                  70                  75                  80

Leu Glu Ile Val Glu Val Leu Leu Lys Ala Gly Ala Asp Val Asn Ala
                85                  90                  95

Gln Asp Ile Phe Gly Lys Thr Pro Ala Asp Ile Ala Ala Asp Ala Gly
            100                 105                 110

His Glu Asp Ile Ala Glu Val Leu Gln Lys Ala Ala Gly Ser Pro Thr
        115                 120                 125

Pro Thr Pro Thr Thr Pro Thr Pro Thr Pro Thr Thr Pro Thr Pro Thr
    130                 135                 140

Pro Thr Gly Ser Asp Leu Gly Ile Lys Leu Leu Phe Ala Ala Ala Lys
145                 150                 155                 160

Gly Gln Asp Asp Glu Val Arg Glu Leu Leu Lys Ala Gly Ala Asp Val
                165                 170                 175

Asn Ala Lys Asp Phe Gln Gly Val Thr Pro Leu His Ile Ala Ala Gln
            180                 185                 190
```

Ser Gly His Leu Glu Ile Val Glu Val Leu Lys Ala Gly Ala Asp
    195                 200                 205

Val Asn Ala Lys Asp Val Thr Gly Asp Thr Pro Leu His Leu Ala Ala
210                 215                 220

Gln His Gly His Leu Glu Ile Val Glu Val Leu Leu Lys Ala Gly Ala
225                 230                 235                 240

Asp Val Asn Ala Gln Asp Glu Arg Gly Trp Thr Pro Ala Asp Leu Ala
                245                 250                 255

Ala Asp Trp Gly His Glu Asp Ile Ala Glu Val Leu Gln Lys Ala Ala
                260                 265                 270

Gly Ser Pro Thr Pro Thr Pro Thr Thr Pro Thr Pro Thr Pro Thr Thr
                275                 280                 285

Pro Thr Pro Thr Pro Thr Gly Ser Asp Leu Gly Lys Lys Leu Leu Glu
                290                 295                 300

Ala Ala Arg Ala Gly Gln Asp Asp Glu Val Arg Glu Leu Leu Lys Ala
305                 310                 315                 320

Gly Ala Asp Val Asn Ala Lys Asp Glu Tyr Gly Leu Thr Pro Leu Tyr
                325                 330                 335

Leu Ala Thr Ala His Gly His Leu Glu Ile Val Glu Val Leu Leu Lys
                340                 345                 350

Ala Gly Ala Asp Val Asn Ala Val Asp Ala Ile Gly Phe Thr Pro Leu
                355                 360                 365

His Leu Ala Ala Phe Ile Gly His Leu Glu Ile Ala Glu Val Leu Leu
                370                 375                 380

Lys Ala Gly Ala Asp Val Asn Ala Gln Asp Lys Phe Gly Lys Thr Pro
385                 390                 395                 400

Ala Asp Ile Ala Ala Gly Ala Gly Asn Glu Asp Ile Ala Glu Val Leu
                405                 410                 415

Gln Lys Ala Ala Gly Ser Pro Thr Pro Thr Pro Thr Thr Pro Thr Pro
                420                 425                 430

Thr Pro Thr Thr Pro Thr Pro Thr Pro Thr Gly Ser Asp Leu Gly Lys
                435                 440                 445

Lys Leu Leu Glu Ala Ala Arg Ala Gly Gln Asp Asp Glu Val Arg Glu
450                 455                 460

Leu Leu Lys Ala Gly Ala Asp Val Asn Ala Lys Asp Tyr Phe Ser His
465                 470                 475                 480

Thr Pro Leu His Leu Ala Ala Arg Asn Gly His Leu Lys Ile Val Glu
                485                 490                 495

Val Leu Leu Lys Ala Gly Ala Asp Val Asn Ala Lys Asp Phe Ala Gly
                500                 505                 510

Lys Thr Pro Leu His Leu Ala Ala Asn Glu Gly His Leu Glu Ile Val
                515                 520                 525

Glu Val Leu Leu Lys Ala Gly Ala Asp Val Asn Ala Gln Asp Ile Phe
                530                 535                 540

Gly Lys Thr Pro Ala Asp Ile Ala Ala Asp Gly His Glu Asp Ile
545                 550                 555                 560

Ala Glu Val Leu Gln Lys Ala Ala
                565

<210> SEQ ID NO 9
<211> LENGTH: 601
<212> TYPE: PRT
<213> ORGANISM: Artificial Sequence
<220> FEATURE:

<223> OTHER INFORMATION: Protein comprising four ankyrin repeat domains

<400> SEQUENCE: 9

```
Asp Leu Gly Lys Lys Leu Leu Glu Ala Ala Arg Ala Gly Gln Asp Asp
1               5                   10                  15

Glu Val Arg Glu Leu Leu Lys Ala Gly Ala Asp Val Asn Ala Lys Asp
            20                  25                  30

Tyr Phe Ser His Thr Pro Leu His Leu Ala Ala Arg Asn Gly His Leu
        35                  40                  45

Lys Ile Val Glu Val Leu Leu Lys Ala Gly Ala Asp Val Asn Ala Lys
    50                  55                  60

Asp Phe Ala Gly Lys Thr Pro Leu His Leu Ala Ala Asp Gly His
65                  70                  75                  80

Leu Glu Ile Val Glu Val Leu Leu Lys Ala Gly Ala Asp Val Asn Ala
                85                  90                  95

Gln Asp Ile Phe Gly Lys Thr Pro Ala Asp Ile Ala Ala Asp Ala Gly
            100                 105                 110

His Glu Asp Ile Ala Glu Val Leu Gln Lys Ala Ala Gly Ser Pro Thr
        115                 120                 125

Pro Thr Pro Thr Thr Pro Thr Pro Thr Pro Thr Pro Thr Pro Thr
130                 135                 140

Pro Thr Gly Ser Asp Leu Gly Lys Lys Leu Leu Glu Ala Ala Arg Ala
145                 150                 155                 160

Gly Gln Asp Asp Glu Val Arg Ile Leu Leu Lys Ala Gly Ala Asp Val
                165                 170                 175

Asn Ala Lys Asp Arg Tyr Gly Asp Thr Pro Leu His Leu Ala Ala Asp
            180                 185                 190

Ile Gly His Leu Glu Ile Val Glu Val Leu Leu Lys Ala Gly Ala Asp
        195                 200                 205

Val Asn Ala Glu Asp Tyr Phe Gly Asn Thr Pro Leu His Leu Ala Ala
    210                 215                 220

Ser Tyr Gly His Leu Glu Ile Val Glu Val Leu Leu Lys Ala Gly Ala
225                 230                 235                 240

Asp Val Asn Ala Lys Asp Asp Tyr Gly Asn Thr Pro Leu His Leu Ala
                245                 250                 255

Ala Asn Thr Gly His Leu Glu Ile Val Glu Val Leu Leu Lys Ala Gly
            260                 265                 270

Ala Asp Val Asn Ala Gln Asp Lys Ser Gly Lys Thr Pro Ala Asp Leu
        275                 280                 285

Ala Ala Asp Ala Gly His Glu Asp Ile Ala Glu Val Leu Gln Lys Ala
    290                 295                 300

Ala Gly Ser Pro Thr Pro Thr Pro Thr Thr Pro Thr Pro Thr Pro Thr
305                 310                 315                 320

Thr Pro Thr Pro Thr Pro Thr Gly Ser Asp Leu Asp Lys Lys Leu Leu
                325                 330                 335

Glu Ala Ala Arg Ala Gly Gln Asp Asp Glu Val Arg Ile Leu Leu Lys
            340                 345                 350

Ala Gly Ala Asp Val Asn Ala Lys Asp Ser Thr Gly Trp Thr Pro Leu
        355                 360                 365

His Leu Ala Ala Pro Trp Gly His Pro Glu Ile Val Glu Val Leu Leu
    370                 375                 380

Lys Ala Gly Ala Asp Val Asn Ala Lys Asp Phe Gln Gly Trp Thr Pro
385                 390                 395                 400
```

```
Leu His Leu Ala Ala Ala Ala Gly His Leu Glu Ile Val Glu Val Leu
                405                 410                 415

Leu Lys Ala Gly Ala Asp Val Asn Ala Gln Asp Lys Ser Gly Lys Thr
            420                 425                 430

Pro Ala Asp Leu Ala Ala Asp Ala Gly His Glu Asp Ile Ala Glu Val
            435                 440                 445

Leu Gln Lys Ala Ala Gly Ser Pro Thr Pro Thr Pro Thr Thr Pro Thr
        450                 455                 460

Pro Thr Pro Thr Thr Pro Thr Pro Thr Pro Thr Gly Ser Asp Leu Gly
465                 470                 475                 480

Lys Lys Leu Leu Glu Ala Ala Arg Ala Gly Gln Asp Asp Glu Val Arg
                485                 490                 495

Glu Leu Leu Lys Ala Gly Ala Asp Val Asn Ala Lys Asp Tyr Phe Ser
            500                 505                 510

His Thr Pro Leu His Leu Ala Ala Arg Asn Gly His Leu Lys Ile Val
            515                 520                 525

Glu Val Leu Leu Lys Ala Gly Ala Asp Val Asn Ala Lys Asp Phe Ala
        530                 535                 540

Gly Lys Thr Pro Leu His Leu Ala Ala Ala Asp Gly His Leu Glu Ile
545                 550                 555                 560

Val Glu Val Leu Leu Lys Ala Gly Ala Asp Val Asn Ala Gln Asp Ile
                565                 570                 575

Phe Gly Lys Thr Pro Ala Asp Ile Ala Ala Asp Ala Gly His Glu Asp
            580                 585                 590

Ile Ala Glu Val Leu Gln Lys Ala Ala
        595                 600

<210> SEQ ID NO 10
<211> LENGTH: 568
<212> TYPE: PRT
<213> ORGANISM: Artificial Sequence
<220> FEATURE:
<223> OTHER INFORMATION: Protein comprising four ankyrin repeat domains

<400> SEQUENCE: 10

Asp Leu Gly Lys Lys Leu Leu Glu Ala Ala Arg Ala Gly Gln Asp Asp
1               5                   10                  15

Glu Val Arg Glu Leu Leu Lys Ala Gly Ala Asp Val Asn Ala Lys Asp
            20                  25                  30

Tyr Phe Ser His Thr Pro Leu His Leu Ala Ala Arg Asn Gly His Leu
        35                  40                  45

Lys Ile Val Glu Val Leu Leu Lys Ala Gly Ala Asp Val Asn Ala Lys
    50                  55                  60

Asp Phe Ala Gly Lys Thr Pro Leu His Leu Ala Ala Asp Gly His
65                  70                  75                  80

Leu Glu Ile Val Glu Val Leu Leu Lys Ala Gly Ala Asp Val Asn Ala
                85                  90                  95

Gln Asp Ile Phe Gly Lys Thr Pro Ala Asp Ile Ala Ala Asp Ala Gly
            100                 105                 110

His Glu Asp Ile Ala Glu Val Leu Gln Lys Ala Ala Gly Ser Pro Thr
        115                 120                 125

Pro Thr Pro Thr Thr Pro Thr Pro Thr Pro Thr Thr Pro Thr Pro Thr
    130                 135                 140

Pro Thr Gly Ser Asp Leu Gly Ile Lys Leu Leu Phe Ala Ala Ala Lys
145                 150                 155                 160
```

```
Gly Gln Asp Asp Glu Val Arg Glu Leu Leu Lys Ala Gly Ala Asp Val
            165                 170                 175

Asn Ala Lys Asp Phe Gln Gly Val Thr Pro Leu His Ile Ala Ala Gln
        180                 185                 190

Ser Gly His Leu Glu Ile Val Glu Val Leu Leu Lys Ala Gly Ala Asp
        195                 200                 205

Val Asn Ala Lys Asp Val Thr Gly Asp Thr Pro Leu His Leu Ala Ala
    210                 215                 220

Gln His Gly His Leu Glu Ile Val Glu Val Leu Leu Lys Ala Gly Ala
225                 230                 235                 240

Asp Val Asn Ala Gln Asp Glu Arg Gly Trp Thr Pro Ala Asp Leu Ala
                245                 250                 255

Ala Asp Trp Gly His Glu Asp Ile Ala Glu Val Leu Gln Lys Ala Ala
            260                 265                 270

Gly Ser Pro Thr Pro Thr Pro Thr Pro Thr Pro Thr Pro Thr Pro Thr Thr
        275                 280                 285

Pro Thr Pro Thr Pro Thr Gly Ser Asp Leu Gly Lys Lys Leu Leu Glu
        290                 295                 300

Ala Ala Arg Ala Gly Gln Asp Asp Glu Val Arg Glu Leu Leu Lys Ala
305                 310                 315                 320

Gly Ala Asp Val Asn Ala Lys Asp Glu Tyr Gly Leu Thr Pro Leu Tyr
                325                 330                 335

Leu Ala Thr Ala His Gly His Leu Glu Ile Val Glu Val Leu Leu Lys
            340                 345                 350

Ala Gly Ala Asp Val Asn Ala Val Asp Ala Ile Gly Phe Thr Pro Leu
            355                 360                 365

His Leu Ala Ala Phe Ile Gly His Leu Glu Ile Ala Glu Val Leu Leu
        370                 375                 380

Lys Ala Gly Ala Asp Val Asn Ala Gln Asp Lys Phe Gly Lys Thr Pro
385                 390                 395                 400

Ala Asp Ile Ala Ala Gly Ala Gly Asn Glu Asp Ile Ala Glu Val Leu
                405                 410                 415

Gln Lys Ala Ala Gly Ser Pro Thr Pro Thr Pro Thr Thr Pro Thr Pro
            420                 425                 430

Thr Pro Thr Thr Pro Thr Pro Thr Pro Thr Gly Ser Asp Leu Gly Lys
        435                 440                 445

Lys Leu Leu Glu Ala Ala Arg Ala Gly Gln Asp Asp Glu Val Arg Glu
450                 455                 460

Leu Leu Lys Ala Gly Ala Asp Val Asn Ala Lys Asp Tyr Phe Ser His
465                 470                 475                 480

Thr Pro Leu His Leu Ala Ala Arg Asn Gly His Leu Lys Ile Val Glu
            485                 490                 495

Val Leu Leu Lys Ala Gly Ala Asp Val Asn Ala Lys Asp Phe Ala Gly
            500                 505                 510

Lys Thr Pro Leu His Leu Ala Ala Ala Asp Gly His Leu Glu Ile Val
        515                 520                 525

Glu Val Leu Leu Lys Ala Gly Ala Asp Val Asn Ala Gln Asp Ile Phe
530                 535                 540

Gly Lys Thr Pro Ala Asp Ile Ala Ala Asp Ala Gly His Glu Asp Ile
545                 550                 555                 560

Ala Glu Val Leu Gln Lys Ala Ala
                565
```

-continued

<210> SEQ ID NO 11
<211> LENGTH: 601
<212> TYPE: PRT
<213> ORGANISM: Artificial Sequence
<220> FEATURE:
<223> OTHER INFORMATION: Protein comprising four ankyrin repeat domains

<400> SEQUENCE: 11

```
Asp Leu Gly Lys Lys Leu Leu Glu Ala Ala Arg Ala Gly Gln Asp Asp
1               5                   10                  15

Glu Val Arg Glu Leu Leu Lys Ala Gly Ala Asp Val Asn Ala Lys Asp
            20                  25                  30

Tyr Phe Ser His Thr Pro Leu His Leu Ala Ala Arg Asn Gly His Leu
        35                  40                  45

Lys Ile Val Glu Val Leu Leu Lys Ala Gly Ala Asp Val Asn Ala Lys
    50                  55                  60

Asp Phe Ala Gly Lys Thr Pro Leu His Leu Ala Ala Asp Ala Gly His
65                  70                  75                  80

Leu Glu Ile Val Glu Val Leu Leu Lys Ala Gly Ala Asp Val Asn Ala
                85                  90                  95

Gln Asp Ile Phe Gly Lys Thr Pro Ala Asp Ile Ala Ala Asp Ala Gly
            100                 105                 110

His Glu Asp Ile Ala Glu Val Leu Gln Lys Ala Ala Gly Ser Pro Thr
        115                 120                 125

Pro Thr Pro Thr Thr Pro Thr Pro Thr Pro Thr Pro Thr Pro Thr
    130                 135                 140

Pro Thr Gly Ser Asp Leu Gly Lys Lys Leu Leu Glu Ala Ala Arg Ala
145                 150                 155                 160

Gly Gln Asp Asp Glu Val Arg Ile Leu Leu Lys Ala Gly Ala Asp Val
                165                 170                 175

Asn Ala Lys Asp Arg Tyr Gly Asp Thr Pro Leu His Leu Ala Ala Asp
            180                 185                 190

Ile Gly His Leu Glu Ile Val Glu Val Leu Leu Lys Ala Gly Ala Asp
        195                 200                 205

Val Asn Ala Glu Asp Tyr Phe Gly Asn Thr Pro Leu His Leu Ala Ala
    210                 215                 220

Ser Tyr Gly His Leu Glu Ile Val Glu Val Leu Leu Lys Ala Gly Ala
225                 230                 235                 240

Asp Val Asn Ala Lys Asp Asp Tyr Gly Asn Thr Pro Leu His Leu Ala
                245                 250                 255

Ala Asn Thr Gly His Leu Glu Ile Val Glu Val Leu Leu Lys Ala Gly
            260                 265                 270

Ala Asp Val Asn Ala Gln Asp Lys Ser Gly Lys Thr Pro Ala Asp Leu
        275                 280                 285

Ala Ala Asp Ala Gly His Glu Asp Ile Ala Glu Val Leu Gln Lys Ala
    290                 295                 300

Ala Gly Ser Pro Thr Pro Thr Pro Thr Thr Pro Thr Pro Thr Pro Thr
305                 310                 315                 320

Thr Pro Thr Pro Thr Pro Thr Gly Ser Asp Leu Asp Lys Lys Leu Leu
                325                 330                 335

Glu Ala Ala Arg Ala Gly Gln Asp Asp Glu Val Arg Ile Leu Leu Lys
            340                 345                 350

Ala Gly Ala Asp Val Asn Ala Lys Asp Ser Thr Gly Trp Thr Pro Leu
        355                 360                 365

His Leu Ala Ala Pro Trp Gly His Pro Glu Ile Val Glu Val Leu Leu
```

```
            370                 375                 380
Lys Ala Gly Ala Asp Val Asn Ala Lys Asp Phe Gln Gly Trp Thr Pro
385                 390                 395                 400

Leu His Leu Ala Ala Ala Gly His Leu Glu Ile Val Glu Val Leu
                405                 410                 415

Leu Lys Ala Gly Ala Asp Val Asn Ala Gln Asp Lys Ser Gly Lys Thr
                420                 425                 430

Pro Ala Asp Leu Ala Ala Asp Ala Gly His Glu Asp Ile Ala Glu Val
                435                 440                 445

Leu Gln Lys Ala Ala Gly Ser Pro Thr Pro Thr Pro Thr Thr Pro Thr
                450                 455                 460

Pro Thr Pro Thr Thr Pro Thr Pro Thr Pro Thr Gly Ser Asp Leu Gly
465                 470                 475                 480

Lys Lys Leu Leu Glu Ala Ala Arg Ala Gly Gln Asp Asp Glu Val Arg
                485                 490                 495

Glu Leu Leu Lys Ala Gly Ala Asp Val Asn Ala Lys Asp Tyr Phe Ser
                500                 505                 510

His Thr Pro Leu His Leu Ala Ala Arg Asn Gly His Leu Lys Ile Val
                515                 520                 525

Glu Val Leu Leu Lys Ala Gly Ala Asp Val Asn Ala Lys Asp Phe Ala
                530                 535                 540

Gly Lys Thr Pro Leu His Leu Ala Ala Asp Ala Gly His Leu Glu Ile
545                 550                 555                 560

Val Glu Val Leu Leu Lys Ala Gly Ala Asp Val Asn Ala Gln Asp Ile
                565                 570                 575

Phe Gly Lys Thr Pro Ala Asp Ile Ala Ala Asp Ala Gly His Glu Asp
                580                 585                 590

Ile Ala Glu Val Leu Gln Lys Ala Ala
                595                 600

<210> SEQ ID NO 12
<211> LENGTH: 568
<212> TYPE: PRT
<213> ORGANISM: Artificial Sequence
<220> FEATURE:
<223> OTHER INFORMATION: Protein comprising four ankyrin repeat domains

<400> SEQUENCE: 12

Asp Leu Gly Lys Lys Leu Leu Glu Ala Ala Arg Ala Gly Gln Asp Asp
1               5                   10                  15

Glu Val Arg Glu Leu Leu Lys Ala Gly Ala Asp Val Asn Ala Lys Asp
                20                  25                  30

Tyr Phe Ser His Thr Pro Leu His Leu Ala Ala Arg Asn Gly His Leu
                35                  40                  45

Lys Ile Val Glu Val Leu Leu Lys Ala Gly Ala Asp Val Asn Ala Lys
50                  55                  60

Asp Phe Ala Gly Lys Thr Pro Leu His Leu Ala Asp Ala Gly His
65                  70                  75                  80

Leu Glu Ile Val Glu Val Leu Leu Lys Ala Gly Ala Asp Val Asn Ala
                85                  90                  95

Gln Asp Ile Phe Gly Lys Thr Pro Ala Asp Ile Ala Ala Asp Ala Gly
                100                 105                 110

His Glu Asp Ile Ala Glu Val Leu Gln Lys Ala Ala Gly Ser Pro Thr
                115                 120                 125

Pro Thr Pro Thr Thr Pro Thr Pro Thr Pro Thr Thr Pro Thr Pro Thr
```

```
                130                 135                 140
Pro Thr Gly Ser Asp Leu Gly Ile Lys Leu Leu Phe Ala Ala Ala Lys
145                 150                 155                 160

Gly Gln Asp Asp Glu Val Arg Glu Leu Leu Lys Ala Gly Ala Asp Val
                165                 170                 175

Asn Ala Lys Asp Phe Gln Gly Val Thr Pro Leu His Ile Ala Ala Gln
                180                 185                 190

Ser Gly His Leu Glu Ile Val Glu Val Leu Leu Lys Ala Gly Ala Asp
                195                 200                 205

Val Asn Ala Lys Asp Val Thr Gly Asp Thr Pro Leu His Leu Ala Ala
210                 215                 220

Gln His Gly His Leu Glu Ile Val Glu Val Leu Leu Lys Ala Gly Ala
225                 230                 235                 240

Asp Val Asn Ala Gln Asp Glu Arg Gly Trp Thr Pro Ala Asp Leu Ala
                245                 250                 255

Ala Asp Trp Gly His Glu Asp Ile Ala Glu Val Leu Gln Lys Ala Ala
                260                 265                 270

Gly Ser Pro Thr Pro Thr Pro Thr Pro Thr Pro Thr Pro Thr Thr
                275                 280                 285

Pro Thr Pro Thr Pro Thr Gly Ser Asp Leu Gly Lys Lys Leu Leu Glu
290                 295                 300

Ala Ala Arg Ala Gly Gln Asp Asp Glu Val Arg Glu Leu Leu Lys Ala
305                 310                 315                 320

Gly Ala Asp Val Asn Ala Lys Asp Glu Tyr Gly Leu Thr Pro Leu Tyr
                325                 330                 335

Leu Ala Thr Ala His Gly His Leu Glu Ile Val Glu Val Leu Leu Lys
                340                 345                 350

Ala Gly Ala Asp Val Asn Ala Val Asp Ala Ile Gly Phe Thr Pro Leu
                355                 360                 365

His Leu Ala Ala Phe Ile Gly His Leu Glu Ile Ala Glu Val Leu Leu
                370                 375                 380

Lys Ala Gly Ala Asp Val Asn Ala Gln Asp Lys Phe Gly Lys Thr Pro
385                 390                 395                 400

Ala Asp Ile Ala Ala Gly Ala Gly Asn Glu Asp Ile Ala Glu Val Leu
                405                 410                 415

Gln Lys Ala Ala Gly Ser Pro Thr Pro Thr Pro Thr Pro Thr Pro
                420                 425                 430

Thr Pro Thr Thr Pro Thr Pro Thr Pro Thr Gly Ser Asp Leu Gly Lys
                435                 440                 445

Lys Leu Leu Glu Ala Ala Arg Ala Gly Gln Asp Asp Glu Val Arg Glu
450                 455                 460

Leu Leu Lys Ala Gly Ala Asp Val Asn Ala Lys Asp Tyr Phe Ser His
465                 470                 475                 480

Thr Pro Leu His Leu Ala Ala Arg Asn Gly His Leu Lys Ile Val Glu
                485                 490                 495

Val Leu Leu Lys Ala Gly Ala Asp Val Asn Ala Lys Asp Phe Ala Gly
                500                 505                 510

Lys Thr Pro Leu His Leu Ala Ala Asp Ala Gly His Leu Glu Ile Val
                515                 520                 525

Glu Val Leu Leu Lys Ala Gly Ala Asp Val Asn Ala Gln Asp Ile Phe
530                 535                 540

Gly Lys Thr Pro Ala Asp Ile Ala Ala Asp Ala Gly His Glu Asp Ile
545                 550                 555                 560
```

```
Ala Glu Val Leu Gln Lys Ala Ala
                565

<210> SEQ ID NO 13
<211> LENGTH: 16
<212> TYPE: PRT
<213> ORGANISM: Artificial Sequence
<220> FEATURE:
<223> OTHER INFORMATION: Sequence motif
<220> FEATURE:
<221> NAME/KEY: MISC_FEATURE
<222> LOCATION: (14)..(14)
<223> OTHER INFORMATION: X represents an amino acid residue selected
      from the group consisting of A, D, and I; preferably, A and D
<220> FEATURE:
<221> NAME/KEY: MISC_FEATURE
<222> LOCATION: (15)..(15)
<223> OTHER INFORMATION: X represents an amino acid residue selected
      from the group consisting of A and D

<400> SEQUENCE: 13

Lys Asp Phe Ala Gly Lys Thr Pro Leu His Leu Ala Ala Xaa Xaa Gly
1               5                   10                  15

<210> SEQ ID NO 14
<211> LENGTH: 16
<212> TYPE: PRT
<213> ORGANISM: Artificial Sequence
<220> FEATURE:
<223> OTHER INFORMATION: Sequence motif

<400> SEQUENCE: 14

Lys Asp Phe Ala Gly Lys Thr Pro Leu His Leu Ala Ala Ala Asp Gly
1               5                   10                  15

<210> SEQ ID NO 15
<211> LENGTH: 16
<212> TYPE: PRT
<213> ORGANISM: Artificial Sequence
<220> FEATURE:
<223> OTHER INFORMATION: Sequence motif

<400> SEQUENCE: 15

Lys Asp Phe Ala Gly Lys Thr Pro Leu His Leu Ala Ala Asp Ala Gly
1               5                   10                  15
```